(12) United States Patent
Amirghodsi et al.

(10) Patent No.: US 12,482,077 B2
(45) Date of Patent: Nov. 25, 2025

(54) GENERATING ITERATIVE INPAINTING DIGITAL IMAGES VIA NEURAL NETWORK BASED PERCEPTUAL ARTIFACT SEGMENTATIONS

(71) Applicant: Adobe Inc., San Jose, CA (US)

(72) Inventors: Sohrab Amirghodsi, Seattle, WA (US); Lingzhi Zhang, Philadelphia, PA (US); Zhe Lin, Fremont, CA (US); Elya Shechtman, Seattle, WA (US); Yuqian Zhou, Urbana, IL (US); Connelly Barnes, Seattle, WA (US)

(73) Assignee: Adobe Inc., San Jose, CA (US)

( * ) Notice: Subject to any disclaimer, the term of this patent is extended or adjusted under 35 U.S.C. 154(b) by 572 days.

(21) Appl. No.: 17/815,418

(22) Filed: Jul. 27, 2022

(65) Prior Publication Data
US 2024/0046429 A1 Feb. 8, 2024

(51) Int. Cl.
*G06T 5/77* (2024.01)
*G06T 7/11* (2017.01)

(52) U.S. Cl.
CPC ............... *G06T 5/77* (2024.01); *G06T 7/11* (2017.01); *G06T 2207/20084* (2013.01)

(58) Field of Classification Search
CPC ... G06T 5/77; G06T 7/11; G06T 2207/20084; G06T 2207/20081; G06T 5/60
See application file for complete search history.

(56) References Cited

U.S. PATENT DOCUMENTS

2017/0193594 A1 7/2017 Glasgow et al.
2021/0264591 A1* 8/2021 Park ................... G06T 7/0012
(Continued)

FOREIGN PATENT DOCUMENTS

CN 114387642 A 4/2022
WO 2022119870 A1 6/2022

OTHER PUBLICATIONS

U.S. Appl. No. 17/815,409, Nov. 6, 2024, Office Action.
(Continued)

*Primary Examiner* — Matthew C Bella
*Assistant Examiner* — Andrew B. Jones
(74) *Attorney, Agent, or Firm* — Keller Preece PLLC

(57) ABSTRACT

Methods, systems, and non-transitory computer readable storage media are disclosed for generating neural network based perceptual artifact segmentations in synthetic digital image content. The disclosed system utilizing neural networks to detect perceptual artifacts in digital images in connection with generating or modifying digital images. The disclosed system determines a digital image including one or more synthetically modified portions. The disclosed system utilizes an artifact segmentation machine-learning model to detect perceptual artifacts in the synthetically modified portion(s). The artifact segmentation machine-learning model is trained to detect perceptual artifacts based on labeled artifact regions of synthetic training digital images. Additionally, the disclosed system utilizes the artifact segmentation machine-learning model in an iterative inpainting process. The disclosed system utilizes one or more digital image inpainting models to inpaint in a digital image. The disclosed system utilizes the artifact segmentation machine-learning model detect perceptual artifacts in the inpainted portions for additional inpainting iterations.

17 Claims, 16 Drawing Sheets

(56) References Cited

U.S. PATENT DOCUMENTS

| | | |
|---|---|---|
| 2022/0084181 A1 | 3/2022 | Isken et al. |
| 2023/0073223 A1 | 3/2023 | Bergmann et al. |
| 2023/0169325 A1* | 6/2023 | Xie .................. G06N 3/09 |
| | | 706/15 |

OTHER PUBLICATIONS

Barnes, C., Shechtman, E., Finkelstein, A., Goldman, D.B.: Patchmatch: A randomized correspondence algorithm for structural image editing. ACM Trans. Graph. 28(3), 24 (2009).

Everingham, M., Van Gool, L., Williams, C.K., Winn, J., Zisserman, A.: The pascal visual object classes (voc) challenge. International journal of computer vision 88(2), 303-338 (2010).

He, K., Gkioxari, G., Dollar, P., Girshick, R.: Mask r-cnn. In: Proceedings of the IEEE international conference on computer vision. pp. 2961-2969 (2017).

He, K., Zhang, X., Ren, S., Sun, J.: Deep residual learning for image recognition. In: Proceedings of the IEEE conference on computer vision and pattern recognition. pp. 770-778 (2016).

Heusel, M., Ramsauer, H., Unterthiner, T., Nessler, B., Hochreiter, S.: Gans trained by a two time-scale update rule converge to a local nash equilibrium. Advances in neural information processing systems 30 (2017).

Lin, T.Y., Maire, M., Belongie, S., Hays, J., Perona, P., Ramanan, D., Doll'ar, P., Zitnick, C.L.: Microsoft coco: Common objects in context. In: European conference on computer vision. pp. 740-755. Springer (2014).

Long, J., Shelhamer, E., Darrell, T.: Fully convolutional networks for semantic segmentation. In: Proceedings of the IEEE conference on computer vision and pattern recognition. pp. 3431-3-3340 (2015).

Nazeri, K., Ng, E., Joseph, T., Qureshi, F.Z., Ebrahimi, M.: Edgeconnect: Generative image inpainting with adversarial edge learning. arXiv preprint arXiv:1901.00212 (2019).

Parmar, G., Zhang, R., Zhu, J.Y.: On buggy resizing libraries and surprising subtleties in fid calculation. arXiv preprint arXiv:2104.11222 (2021).

Su, S., Yan, Q., Zhu, Y., Zhang, C., Ge, X., Sun, J., Zhang, Y.: Blindly assess image quality in the wild guided by a self-adaptive hyper network. In: Proceedings of the IEEE/CVF Conference on Computer Vision and Pattern Recognition. pp. 3667-3676 (2020).

Suvorov, R., Logacheva, E., Mashikhin, A., Remizova, A., Ashukha, A., Silvestrov, A., Kong, N., Goka, H., Park, K., Lempitsky, V.: Resolution-robust large mask inpainting with fourier convolutions. arXiv preprint arXiv:2109.07161 (2021).

Yu, J., Lin, Z., Yang, J., Shen, X., Lu, X., Huang, T.S.: Free-form image inpainting with gated convolution. In: Proceedings of the IEEE/CVF International Conference on Computer Vision. pp. 4471-4480 (2019).

Zeng, Y., Lin, Z., Yang, J., Zhang, J., Shechtman, E., Lu, H.: High-resolution image inpainting with iterative confidence feedback and guided upsampling. In: European Conference on Computer Vision. pp. 1-17. Springer (2020).

Zhang, R., Isola, P., Efros, A.A., Shechtman, E., Wang, O.: The unreasonable effectiveness of deep features as a perceptual metric. In: Proceedings of the IEEE conference on computer vision and pattern recognition. pp. 586-595 (2018).

Zhao, H., Shi, J., Qi, X., Wang, X., Jia, J.: Pyramid scene parsing network. In: Proceedings of the IEEE conference on computer vision and pattern recognition. pp. 2881-2890 (2017).

Zhao, S., Cui, J., Sheng, Y., Dong, Y., Liang, X., Chang, E.I., Xu, Y.: Large scale image completion via co-modulated generative adversarial networks. arXiv preprint arXiv:2103.10428 (2021).

Zhou, B., Lapedriza, A., Khosla, A., Oliva, A., Torralba, A.: Places: A 10 million image database for scene recognition. IEEE Transactions on Pattern Analysis and Machine Intelligence (2017.

U.S. Appl. No. 17/815,409, Apr. 8, 2025, Office Action.

* cited by examiner

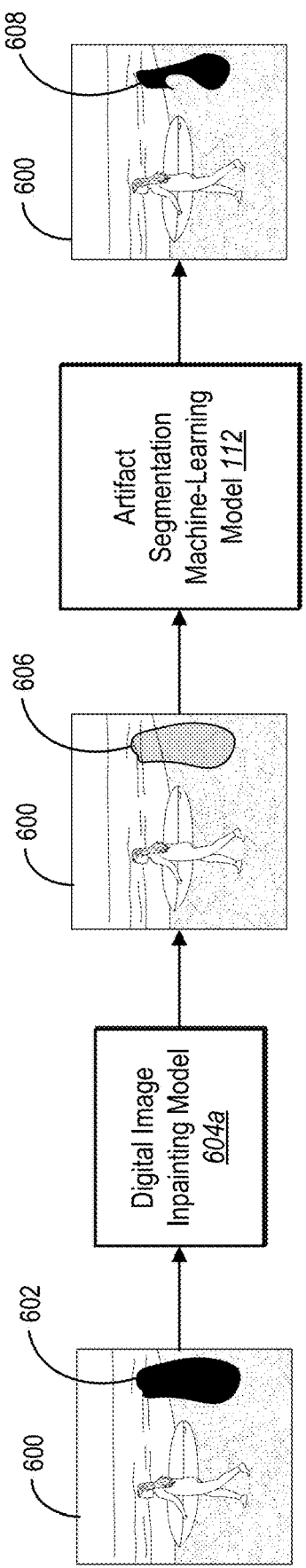
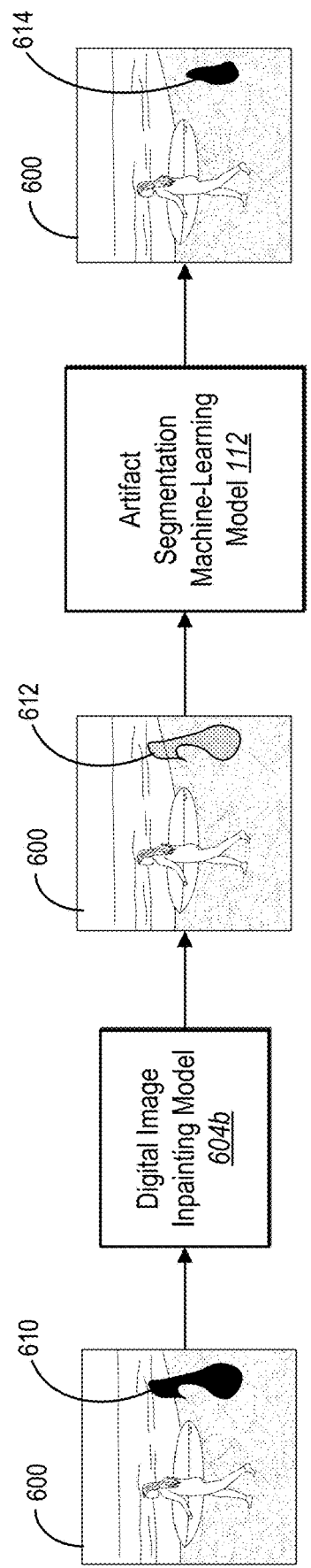
Fig. 6A
Fig. 6B

GENERATING ITERATIVE INPAINTING DIGITAL IMAGES VIA NEURAL NETWORK BASED PERCEPTUAL ARTIFACT SEGMENTATIONS

BACKGROUND

Recent years have seen significant advancements in the fields of digital image processing and machine-learning. Many industries utilize machine-learning techniques to automatically generate and modify digital images for a variety of uses such as correcting errors, object removal, or dataset generation/augmentation. For example, some industries provide tools for performing digital image inpainting operations to digitally remove objects from digital images and automatically fill the hole created by removing the objects utilizing one or more neural networks. Accurately generating or modifying digital images utilizing machine-learning models can be a difficult and resource-expensive task, particularly for certain types of digital image content. Conventional image generation systems are limited in accuracy and flexibility of operation by introducing perceptual artifacts into synthetically generated/modified portions of digital images.

SUMMARY

This disclosure describes one or more embodiments of methods, non-transitory computer readable media, and systems that solve the foregoing problems (in addition to providing other benefits) by utilizing neural networks to detect perceptual artifacts in digital images in connection with generating or modifying digital images. The disclosed systems determine a digital image including one or more synthetically modified portions, such as a digital image generated via an image generation neural network or modified utilizing a digital image inpainting model. The disclosed systems utilize an artifact segmentation machine-learning model to detect perceptual artifacts in the synthetically modified portion(s). In one or more embodiments, the disclosed systems train the artifact segmentation machine-learning model to detect perceptual artifacts based on labeled artifact regions of synthetic training digital images.

In some embodiments, the disclosed systems also utilize the artifact segmentation machine-learning model in an iterative inpainting process. Specifically, the disclosed systems detect a perceptual artifact in a synthetically modified digital image in a first inpainting iteration and determine a first artifact segmentation corresponding to the perceptual artifact. In response to determining the first artifact segmentation, the disclosed systems perform an additional inpainting iteration by generating an additional synthetically modified portion for the first artifact segmentation. Accordingly, the disclosed systems perform a plurality of iterations of an inpainting process to continue inpainting portions of the digital image and detecting artifacts after each inpainting step. The disclosed systems thus provide flexible and accurate detection of perceptual artifacts in synthetically modified digital images in digital image editing processes.

BRIEF DESCRIPTION OF THE DRAWINGS

Various embodiments will be described and explained with additional specificity and detail through the use of the accompanying drawings in which:

FIGS. 6A-6B illustrate diagrams of the artifact segmentation system performing an iterative digital image inpainting process in accordance with one or more implementations.

DETAILED DESCRIPTION

Figure 1:
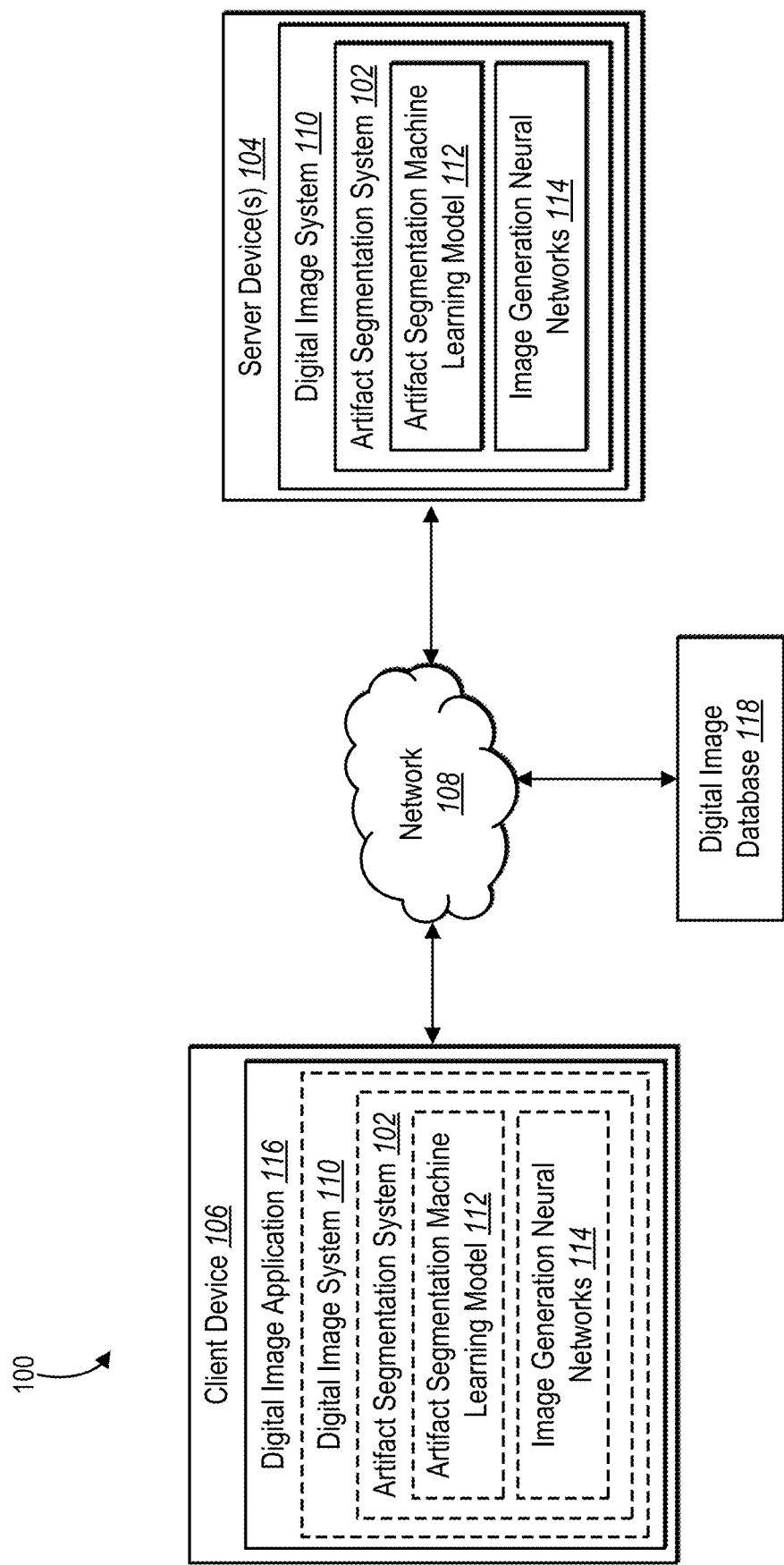
FIG. 1 illustrates an example system environment in which an artifact segmentation system can operate in accordance with one or more implementations.

This disclosure describes one or more embodiments of an artifact segmentation system that detects perceptual artifacts in synthetically modified digital images. In one or more embodiments, the artifact segmentation system utilizes an artifact segmentation machine-learning model to detect perceptual artifact segments in synthetic portions of digital images. In particular, the artifact segmentation system utilizes the artifact segmentation machine-learning model to detect visually noticeable artifacts, such as broken structures or color blobs, in synthetically generated digital image content. The artifact segmentation machine-learning model includes parameters learned based on user-labeled perceptual artifact regions in synthetic training digital images. Additionally, in some embodiments, the artifact segmentation system utilizes the artifact segmentation machine-learning model to detect perceptual artifacts for a variety of digital image tasks and neural network analysis tasks.

In one or more embodiments, as mentioned, the artifact segmentation system utilizes an artifact segmentation machine-learning model to detect perceptual artifacts in a digital image. Specifically, the artifact segmentation system determines a digital image that includes a digital image synthetically generated by an image generation neural network. For example, an image generation neural network (e.g., a digital image inpainting model) generates one or more synthetic portions for inserting into a digital image based on an image mask. In additional embodiments, an image generation neural network generates a new synthetic digital image.

According to one or more embodiments, the artifact segmentation system utilizes an artifact segmentation machine-learning model to detect perceptual artifacts within one or more synthetically modified portions of a digital image. Specifically, the artifact segmentation machine-learning model determines perceptual artifact regions indicating artifacts corresponding to pixels in the synthetically modified portions. Additionally, the artifact segmentation machine-learning model determines artifact segmentations corresponding to the predicted perceptual artifact regions.

In at least some embodiments, the artifact segmentation machine-learning model includes parameters learned based on labeled artifact regions in a plurality of synthetic training digital images. For example, the artifact segmentation system provides training digital images including synthetically modified portions for display to labeling devices and corresponding users to label perceptual artifact regions. The artifact segmentation system uses the training digital images including the labeled perceptual artifact regions to update parameters of the artifact segmentation machine-learning model.

In one or more embodiments, the artifact segmentation system utilizes the trained artifact segmentation machine-learning model to detect perceptual artifacts of synthetically generated image content for use in a variety of digital image applications. For instance, the artifact segmentation system utilizes the artifact segmentation machine-learning model for digital image tasks, such as determining whether a digital image has been modified, whether a modified digital image requires additional modifications to remove perceptual artifacts, or for comparing performance of different image generation neural networks. Additionally, in one or more embodiments, the artifact segmentation system generates an artifact ratio metric that indicates a size ratio of perceptual artifacts in synthetically generated image content in connection with performing various digital image tasks.

As mentioned, in one or more embodiments, the artifact segmentation system leverages perceptual artifact detection to improve image generation tasks. In particular, the artifact segmentation system utilizes an artifact segmentation machine-learning model to detect perceptual artifacts to perform iterative digital image inpainting. To illustrate, the artifact segmentation system performs an iterative digital image inpainting process by iteratively generating synthetic digital image content and detecting perceptual artifacts within the synthetically generated digital image content. Accordingly, the artifact segmentation system performs a plurality of iterations of digital image inpainting to successively reduce the perceptual artifacts in a digital image with each iteration.

According to one or more embodiments, the artifact segmentation system utilizes the artifact segmentation machine-learning model to determine a first artifact segmentation within first synthetically modified digital image content. In response to determining the first artifact segmentation, the artifact segmentation system utilizes a digital image inpainting model to generate second synthetically modified digital content for inserting into the digital image according to the first artifact segmentation. Additionally, the artifact segmentation system performs a plurality of such artifact detection and digital image inpainting iterations to reduce the perceptual artifacts within the digital image.

In some embodiments, the artifact segmentation system utilizes a plurality of digital image inpainting models during an iterative digital image inpainting process. Specifically, in one or more embodiments, the artifact segmentation system selects a digital image inpainting model from the plurality of digital image inpainting models to use during a particular inpainting iteration and/or for specific digital image content. Thus, the artifact segmentation system can utilize different digital image inpainting models for generating synthetic digital image content during different inpainting iterations. Additionally, in some embodiments, the artifact segmentation system utilizes an artifact ratio metric to select a particular digital image inpainting model.

As mentioned, conventional image generation systems have a number of shortcomings in relation to flexibility and accuracy of operation. For example, some conventional image generation systems utilize image generation neural networks to generate synthetic digital image content. While such conventional image generation systems can perform certain types of image content generation tasks with accuracy, these conventional systems often lack accuracy in digital image inpainting or other reconstruction/restoration operations. Specifically, utilizing conventional image generation systems to generate synthetic digital image content for large holes or complex structures within a hole (e.g., due to object removal in a digital image) can result in significant inpainting artifacts, such as broken/imperfect structures (e.g., disconnected or distorted lines), color bleeding, or color blobs. Accordingly, fixing such artifacts in conventional systems typically requires manual user corrections or intervention, which can be very time consuming even for expert users.

Additionally, as a result of the inaccuracies of conventional image generation systems in certain common use cases, the conventional systems also lack flexibility. In particular, because the conventional image generation systems are not able to accurately deal with large hole regions and complex structures, the conventional systems are limited to use in certain digital image editing cases. More specifically, such conventional systems are limited to use in image editing operations involving foreground reconstruction or for background reconstruction in connection with small object removal.

Furthermore, many conventional image generation systems utilize image analysis metrics that compare generated image content to an original image in terms of content/pixel similarity. Although such metrics can provide accurate pixel comparisons when a ground-truth image is available, digital image inpainting processes involving object removal typically do not have access to a ground-truth image with objects removed. Accordingly, conventional systems that rely on such image analysis metrics can produce inaccurate results due to poor/inaccurate training. Some conventional image generation systems utilize quantitative metrics computed on entire images over large evaluation datasets. Such conventional systems lack usefulness and accuracy for analysis of individual hole regions.

The disclosed artifact segmentation system provides a number of advantages over conventional systems. For example, the artifact segmentation system improves the flexibility and accuracy of computing devices that implement digital image generation and editing. In contrast to conventional systems that introduce significant artifacts into synthetically generated digital image content via the use of conventional image generation neural networks, the artifact segmentation system reduces perceptual artifacts in synthetically generated digital content via the use of an artifact segmentation machine-learning model. Specifically, by utilizing a machine-learning model trained on user-labeled perceptual artifacts of digital images, the artifact segmentation system more accurately detects perceptual artifacts in synthetic content consistent with human perception.

Additionally, the artifact segmentation system provides improved accuracy over conventional systems by leveraging a metric based on the relative size of perceptual artifacts in synthetic digital image content. In particular, in contrast to conventional systems that utilize comparison metrics that rely on having a ground-truth image, the artifact segmentation system determines artifact ratio metrics based on the sizes of detected artifacts relative to the sizes of the input holes. By determining the ratio of perceptual artifacts relative to the synthetically generated content, the artifact segmentation system provides an interpretable, intuitive, and simple metric for evaluating and improving the accuracy of synthetic content generated by image generation neural networks. Furthermore, by generating an artifact ratio metric based on perceptual artifacts detected by an artifact segmentation machine-learning model, the artifact segmentation system can automatically evaluate object removal performance, such as in a digital image inpainting process.

Furthermore, the artifact segmentation system provides improved flexibility and accuracy over conventional systems by utilizing automatic perceptual artifact detection in digital image inpainting processes. For example, in contrast to conventional systems that are not capable of automatic artifact detection and segmentation, the artifact segmentation system uses machine-learning based detection of perceptual artifacts to provide an iterative inpainting process. Specifically, the artifact segmentation system automatically detects and segments perceptual artifacts after each digital inpainting operation to determine input regions for subsequent digital inpainting operations. This results in greater accuracy by consistently reducing perceptual artifact regions and improving color/structural content for a number of different digital image inpainting models. Furthermore, by selecting from a plurality of different digital image inpainting models for each digital inpainting operation, the artifact segmentation system increases the types of digital image content to which the artifact segmentation system can apply digital inpainting operations.

As illustrated by the foregoing discussion, the present disclosure utilizes a variety of terms to describe features and advantages of the artifact segmentation system. Additional detail is now provided regarding the meaning of such terms. For example, as used herein, the term "synthetically modified portion" (or "synthetically generated portion") refers to a portion of a digital image generated or modified (e.g., utilizing a machine-learning model). To illustrate, a synthetically modified portion includes a portion of a digital image generated by a digital image inpainting model during an image inpainting process. Alternatively, a synthetically modified portion includes a portion of a digital image generated by another type of image generation neural network (or otherwise modified, such as, by a digital image editing application or algorithm).

As used herein, the term "machine-learning model" refers to one or more computer algorithms that can be tuned (e.g., trained) based on inputs to approximate unknown functions. In particular, a machine-learning model utilizes algorithms to learn from, and make determinations on, known data by analyzing the known data to learn to generate outputs that reflect patterns and attributes of the known data. For instance, a machine-learning model can include, but is not limited to, one or more neural network layers, such as a multi-layer perceptron, a convolutional neural network, a recurrent neural network, a generative adversarial neural network, a feed forward neural network, or any combination thereof. A machine-learning model can learn high-level abstractions in data to generate data-driven determinations, predictions, or decisions from the known input data. Furthermore, as described herein, in some embodiments, an "image generation neural network") includes one or more neural network layers for generating one or more synthetic portions of a digital image. In one or more embodiments, a "digital image inpainting model" includes one or more neural network layers to generate synthetic digital image content for inserting into one or more portions of an existing digital image. Additionally, in some embodiments, an "artifact segmentation machine-learning model" includes one or more neural network layers to detect perceptual artifacts in synthetically modified portions of digital images.

As used herein, the term "perceptual artifact" refers to a visible error in synthetically generated image content. For example, a perceptual artifact includes unexpected structures or colors in synthetically generated image content that given contextual human understanding of structures and colors. To illustrate, perceptual artifacts include broken structures, color blobs, color bleeding, or distorted lines in synthetically generated content. In some embodiments, perceptual artifacts are a result of machine-learning models lacking contextual understanding of real-world shapes and objects that humans learn.

Additionally, as used herein, the term "perceptual artifact region" (or "predicted perceptual artifact region") refers to a portion of a digital image that an artifact segmentation machine-learning model predicts to include at least one perceptual artifact. Furthermore, as used herein, the term "artifact segmentation" refers to an indication of a portion of a digital image including a perceptual artifact. To illustrate, an artifact segmentation includes a mask with one or more boundaries corresponding to perceptual artifact regions in a digital image as predicted by an artifact segmentation machine-learning model.

As used herein, the term "artifact ratio metric" refers to a value indicating a relative size of one or more artifacts within a synthetically modified portion of a digital image. For instance, an artifact ratio metric includes a ratio of a size of one or more predicted perceptual artifact regions relative to a size of one or more synthetically modified portions of a digital image.

As used herein, the term "labeled artifact region" refers to a portion of a digital image marked by a user as including an artifact. Specifically, a labeled artifact region includes a manually identified group of pixels as including a perceptual artifact within a synthetically modified portion of a digital image. More specifically, a labeled artifact region includes a marked portion of a synthetic training digital image for training an artifact segmentation machine-learning model.

As used herein, the term "digital image mask" refers to a mapping of assigned values to pixels of a digital image for restricting one or more operators on the digital image to one or more areas defined by the assigned values. For example, a digital image mask includes zero and non-zero values to indicate one or more objects of a digital image in a digital image editing process. To illustrate, a digital image mask includes a "hole mask" indicating a portion of an object removed (or to be removed) from a digital image and replaced with synthetically modified image content in a digital image inpainting process. Additionally, in some embodiments, a digital image mask includes masking values indicating one or more artifact segmentations in one or more synthetically modified portions of a digital image.

As used herein, the term "inpainting iteration" refers to a digital image editing process of replacing at least a portion of a digital image with synthetically generated digital image content. Specifically, an inpainting iteration includes determining one or more input regions (e.g., based on a digital image mask) and replacing one or more portions of the digital image indicated by the one or more input regions utilizing a digital image inpainting model. In some embodiments, an inpainting iteration includes identifying an artifact in previously modified synthetic image content and generating additional synthetic image content. Accordingly, a plurality of inpainting iterations include successively identifying regions of a digital image to replace with synthetically generated digital image content.

Turning now to the figures, FIG. 1 includes an embodiment of a system environment 100 in which an artifact segmentation system 102 is implemented. In particular, the system environment 100 includes server device(s) 104 and a client device 106 in communication via a network 108. Moreover, as shown, the server device(s) 104 include a digital image system 110, which includes the artifact segmentation system 102. FIG. 1 illustrates that the artifact segmentation system 102 also includes an artifact segmentation machine-learning model 112 and an image generation neural network 114. Additionally, the client device 106 includes a digital image application 116, which optionally includes the digital image system 110 and the artifact segmentation system 102, which further includes the artifact segmentation machine-learning model 112 and the image generation neural network 114. In one or more embodiments, as illustrated in FIG. 1, the system environment 100 also includes a digital image database 118 in communication with the server device(s) 104 and/or the client device 106.

As shown in FIG. 1, the server device(s) 104 includes or host the digital image system 110. The digital image system 110 include, or be part of, one or more systems that implement digital image generation and/or digital image editing. For example, the digital image system 110 provides tools for viewing, generating, editing, and/or otherwise interacting with digital images. To illustrate, the digital image system 110 communicates with the client device 106 via the network 108 to provide the tools for display and interaction via the digital image application 116 at the client device 106.

The digital image system 110 uses the digital images in a variety of applications such as databases of digital images (e.g., the digital image database 118) or other digital media (e.g., in digital videos). In some embodiments, the digital image system 110 communicates with the client device 106 to provide tools for generating or editing digital images from the digital image database 118 or for storing in the digital image database 118. For instance, the digital image system 110 provides tools for generating synthetic digital images for inclusion in a training dataset at the digital image database 118. The digital image system 110 or another system can utilize the digital images in the digital image database 118 to train one or more neural networks (e.g., image generation neural networks or object detection networks).

In some embodiments, the digital image system 110 receives interaction data for viewing, generating, or editing a digital image from the client device 106, processes the interaction data (e.g., to view, generate, or edit a digital image), and provides the results of the interaction data to the client device 106 for display via the digital image application 116 or to a third-party system. Additionally, in some embodiments, the digital image system 110 receives data from the client device 106 in connection with editing digital images, including requests to access digital images stored at the server device(s) 104 (or at another device such as the digital image database 118) and/or requests to store digital images from the client device 106 at the server device(s) 104 (or at another device).

In connection with generating or editing digital images, the digital image system 110 utilizes the artifact segmentation system 102 to generate synthetic digital image content and detect perceptual artifacts in synthetic digital image content. For example, the artifact segmentation system 102 utilizes the image generation neural networks 114 to generate synthetic digital image content for creating a new synthetic digital image or for modifying an existing digital image. Additionally, the artifact segmentation system 102 utilizes the artifact segmentation machine-learning model 112 to detect perceptual artifacts in the synthetically generated digital image content. In one or more embodiments, the artifact segmentation system 102 utilizes the image generation neural networks 114 and the artifact segmentation machine-learning model 112 in an iterative digital image inpainting process.

In one or more embodiments, in response to utilizing the artifact segmentation system 102 to generate synthetic digital image content and detect perceptual artifacts, the digital image system 110 provides the resulting digital image and/or artifact segmentations to the client device 106 for display. For instance, the digital image system 110 sends a modified digital image and/or indications of artifact segmentations to the client device 106 via the network 108 for display via the digital image application 116. Additionally, in some embodiments, the client device 106 receives additional inputs to apply additional changes to the digital image (e.g., based on additional inputs to further modify one or more portions of the digital image). The client device 106 sends a request to apply the additional changes to the digital image to the digital image system 110, and the digital image system 110 utilizes the artifact segmentation system 102 to update the digital image.

In one or more embodiments, the server device(s) 104 include a variety of computing devices, including those described below with reference to FIG. 15. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 15. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). In some embodiments, the client device 106 also performs functions for generating, capturing, or accessing data to provide to the digital image system 110 and the artifact segmentation system 102 in connection with generating or editing digital images. For example, the client device 106 communicates with the server device(s) 104 via the network 108 to provide information (e.g., user interactions) associated with digital images and artifact segmentations. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 15.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the artifact segmentation system 102 being implemented by a particular component and/or device within the system environment 100, the artifact segmentation system 102 can be implemented, in whole or in part, by other computing devices and/or components in the system environment 100 (e.g., the client device 106).

In particular, in some implementations, the artifact segmentation system 102 on the server device(s) 104 supports the artifact segmentation system 102 on the client device 106. For instance, the server device(s) 104 generates or obtains the artifact segmentation system 102 (including the artifact segmentation machine-learning model 112 and the image generation neural networks 114) for the client device 106. The server device(s) 104 trains and provides the artifact segmentation system 102 and the artifact segmentation machine-learning model 112 and image generation neural networks 114 to the client device 106 for performing a digital image generation/editing process at the client device 106. In other words, the client device 106 obtains (e.g., downloads) the artifact segmentation system 102 and the artifact segmentation machine-learning model 112 and image generation neural networks 114 from the server device(s) 104. At this point, the client device 106 is able to utilize the artifact segmentation system 102 (with the artifact segmentation machine-learning model 112 and the image generation neural networks 114) to generate and/or edit digital images with perceptual artifact detection independently from the server device(s) 104.

In alternative embodiments, the artifact segmentation system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform mesh mapping and/or mesh generation operations, and, in response, the artifact segmentation system 102 or the digital image system 110 on the server device(s) 104 performs operations to generate and/or edit digital images. The server device(s) 104 provide the output or results of the operations to the client device 106.

Figure 2:
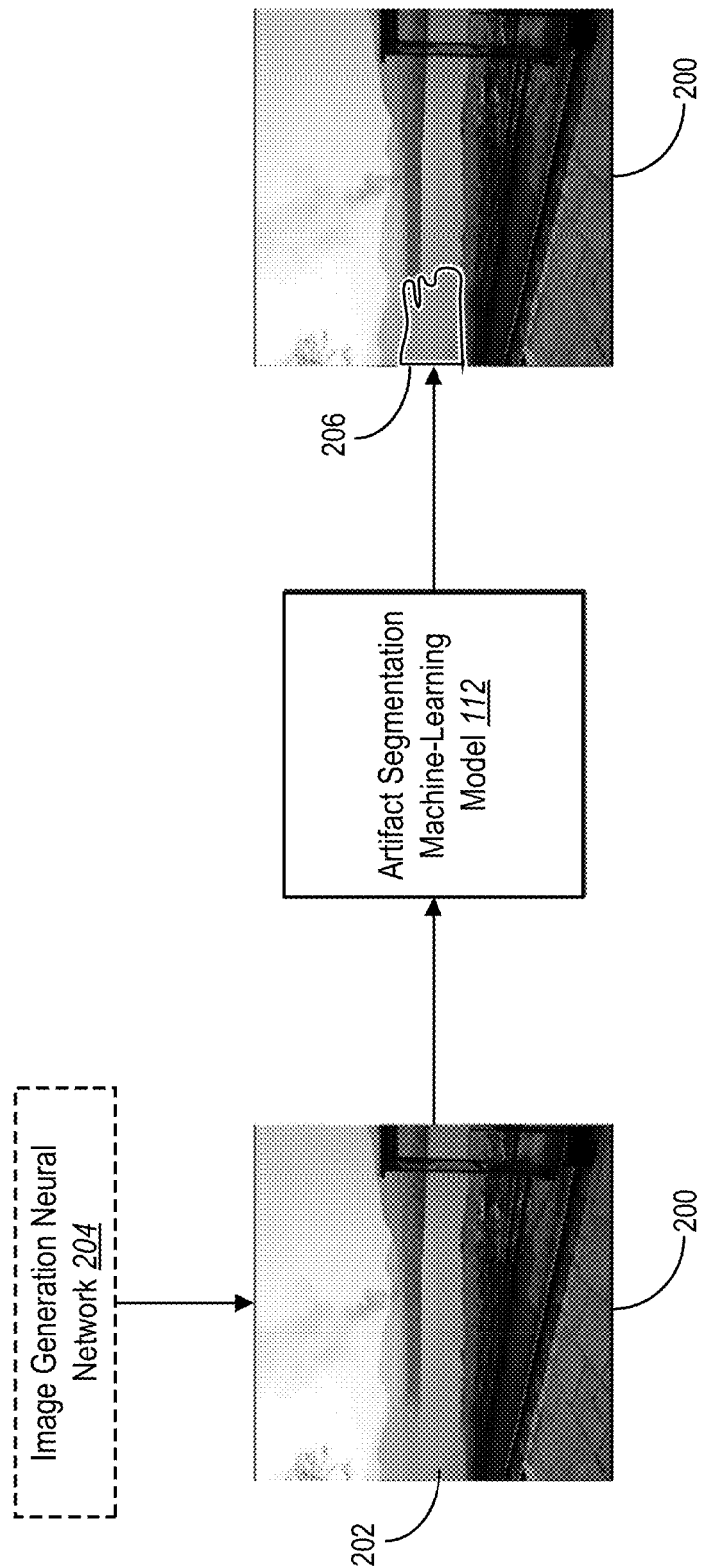
FIG. 2 illustrates a diagram of the artifact segmentation system determining artifact segmentations from a digital image in accordance with one or more implementations.

As mentioned, the artifact segmentation system 102 detects perceptual artifacts in synthetically generated digital image content. FIG. 2 illustrates an overview of the artifact segmentation system 102 detecting perceptual artifacts in a digital image. Specifically, FIG. 2 illustrates that the artifact segmentation system 102 utilizes an artifact segmentation machine-learning model 112 to detect perceptual artifacts in synthetically modified portions of a digital image.

In one or more embodiments, as illustrated in FIG. 2, the artifact segmentation system 102 determines a digital image 200 that includes one or more synthetically modified portions. For example, the digital image 200 includes a photograph of a real-world scene with at least a portion including synthetically modified image content. To illustrate, the digital image 200 includes a synthetically modified portion 202 resulting from a digital image inpainting process that includes removing a portion of the digital image 200 and replacing the removed portion with the synthetically modified portion. In alternative embodiments, the digital image 200 includes a fully synthetically generated digital image.

In one or more embodiments, the artifact segmentation system 102 generates the synthetically modified portion 202 of the digital image 200 utilizing an image generation neural network 204. Specifically, the image generation neural network 204 generates the synthetically modified portion 202 based on a digital image mask provided for the digital image 200. To illustrate, the digital image mask (e.g., a hole mask) includes one or more hole regions indicating one or more portions of the digital image 200 to fill/replace with synthetic digital image content, such as in an object removal process (e.g., to remove a foreground object). The artifact segmentation system 102 utilizes the image generation neural network 204 to generate synthetic digital image content and modify the digital image 200 with the synthetically modified portion 202. In one or more embodiments, the image generation neural network 204 includes a digital image inpainting model or other generative adversarial neural network for generating synthetic digital image content.

According to one or more embodiments, the artifact segmentation system 102 utilizes the artifact segmentation machine-learning model 112 to detect perceptual artifacts in the digital image 200. For instance, the artifact segmentation system 102 utilizes the artifact segmentation machine-learning model 112 to determine one or more predicted perceptual artifact regions indicating one or more artifacts in the digital image 200. To illustrate, as shown in FIG. 2, the artifact segmentation machine-learning model 112 processes the digital image 200 to detect perceptual artifacts in the synthetically modified portion 202 of the digital image 200. For example, the artifact segmentation machine-learning model 112 determines a predicted perceptual artifact region 206 based on the synthetically modified portion 202. In one or more additional embodiments, the artifact segmentation system 102 utilizes the artifact segmentation machine-learning model 112 to generate a plurality of predicted perceptual artifact regions corresponding to different perceptual artifact in the synthetically modified portion 202.

In one or more embodiments, a predicted perceptual artifact region corresponds to a plurality of pixels of a perceptual artifact in a digital image. To illustrate, the artifact segmentation machine-learning model 112 generates predictions of perceptual artifact regions corresponding to pixels in the digital image 200. More specifically, as described in more detail below with respect to FIGS. 3-4, the artifact segmentation system 102 utilizes an artifact segmentation machine-learning model 112 trained on a set of training digital images that include user-labeled regions including perceptual artifacts. Thus, the artifact segmentation system 102 utilizes the artifact segmentation machine-learning model 112 to detect artifacts noticeable to humans based on contextual human understanding of structures and colors.

Furthermore, in one or more embodiments, the artifact segmentation system 102 generates (e.g., utilizing the artifact segmentation machine-learning model 112) one or more artifact segmentations for a digital image via a digital image mask. In particular, the artifact segmentation system 102 determines, for each predicted perceptual artifact region in a digital image, an artifact segmentation based on pixels corresponding to the predicted perceptual artifact region. The artifact segmentation system 102 stores the artifact segmentation in a digital image mask by assigning values to pixels in the digital image mask according to whether each pixel is inside or outside a boundary of the artifact segmentation. Accordingly, the artifact segmentation system 102 generates a digital image mask including any number of "holes" corresponding to predicted perceptual artifact regions (e.g., a first hole corresponding to a first predicted perceptual artifact region and a second hole corresponding to a second predicted perceptual artifact region).

Figure 3:
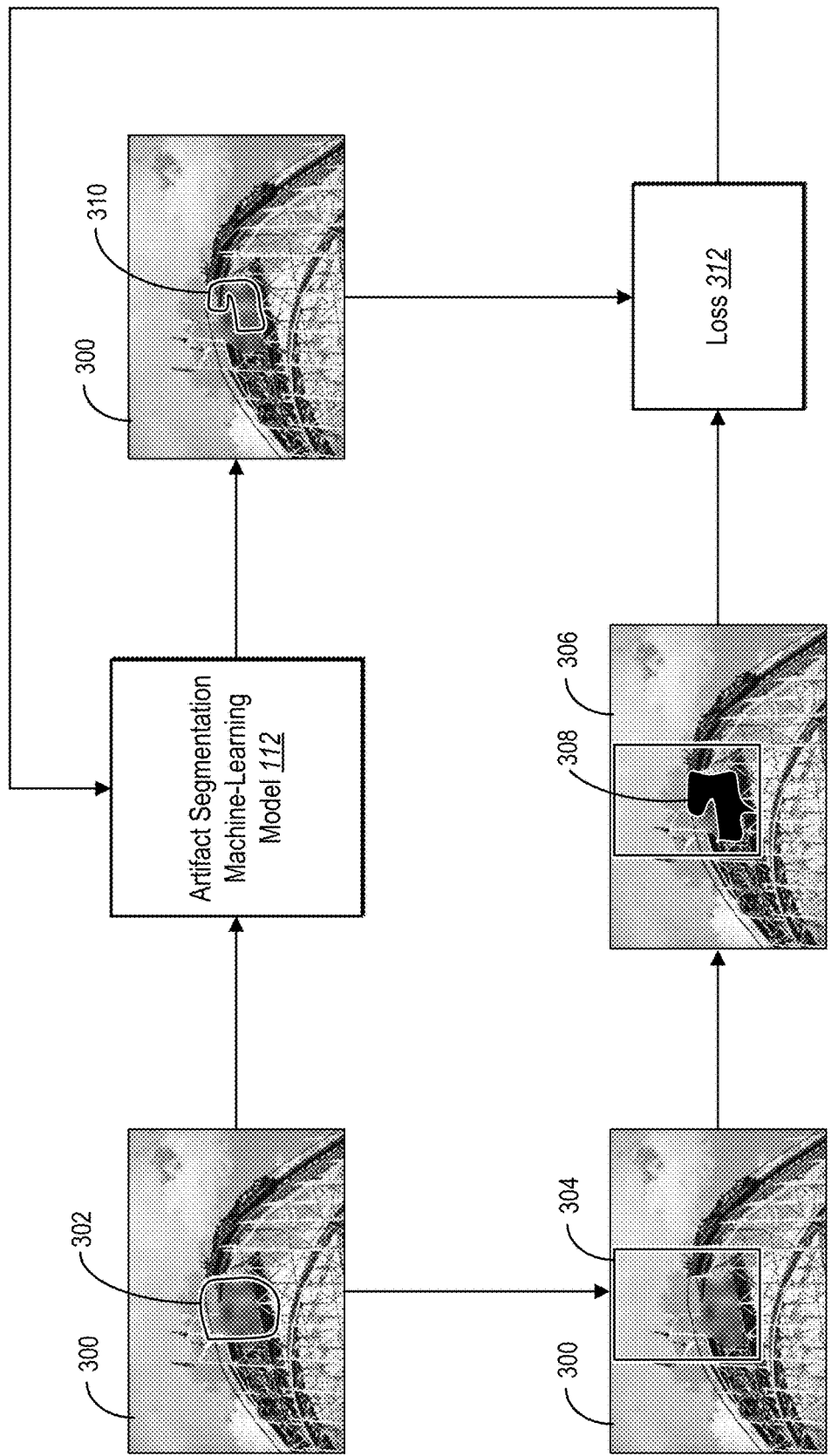
FIG. 3 illustrates a diagram of the artifact segmentation system training an artifact segmentation machine-learning model utilizing labeled artifact regions of synthetic training digital images in accordance with one or more implementations.

As previously mentioned, the artifact segmentation system 102 utilizes an artifact segmentation machine-learning model trained to detect perceptual artifacts based on human-labeled training data. In particular, in one or more embodiments, the artifact segmentation system 102 determines a training dataset of digital images including synthetic digital image content. Additionally, the artifact segmentation system 102 prepares and provides the training dataset for labeling of perceptual artifacts by a plurality of users. FIG. 3 illustrates an overview of the artifact segmentation system 102 preparing synthetic training digital images for obtaining labeled perceptual artifacts. FIG. 3 also illustrates the artifact segmentation system 102 utilizing the labeled perceptual artifacts to train the artifact segmentation machine-learning model 112 to detect perceptual artifacts.

According to one or more embodiments, the artifact segmentation system 102 determines a synthetic training digital image 300 including a synthetically modified portion 302. For example, as previously described, the artifact segmentation system 102 (or another system) modified the synthetic training digital image 300 to include the synthetically modified portion 302 in connection with an object removal process. To illustrate, the artifact segmentation system 102 (or another system) utilizes an image generation neural network to remove an object from the foreground of the synthetic training digital image 300 and replace the object with synthetic digital image content based on an initial hole mask. Alternatively, the artifact segmentation system 102 (or another system) utilizes an image generation neural network to correct an imperfection in a digital image (e.g., due to scanning errors or physical imperfections on a photograph).

As illustrated in FIG. 3, the artifact segmentation system 102 prepares the synthetic training digital image 300 to provide to a plurality of client devices for labeling. In particular, in one or more embodiments, the artifact segmentation system 102 prepares the synthetic training digital image 300 for presentation on display devices of the client devices by dilating an initial hole mask corresponding to the synthetically modified portion 302. For example, the artifact segmentation system 102 dilates the initial hole mask or a boundary of the synthetically modified portion 302 by a predetermined amount. To illustrate, the artifact segmentation system 102 dilates the initial hole mask by a predetermined number of pixels, a predetermined ratio of pixels relative to the size of the initial hole mask and/or the size of the digital image.

In additional embodiments, the artifact segmentation system 102 generates a visible shape based on the initial hole mask. For instance, in response to determining the initial hole mask, the artifact segmentation system 102 determines a rectangle that encloses the synthetically modified portion 302. Specifically, the artifact segmentation system 102 dilates the initial hole mask by a predetermined amount and generates a rectangle based on the dilated initial hole mask. As FIG. 3 illustrates, the artifact segmentation system 102 generates a rectangle 304 that encloses the synthetically modified portion 302 of the synthetic training digital image 300. In some embodiments, the artifact segmentation system 102 generates the rectangle 304 to include edges at the boundaries of the dilated initial hole mask.

In alternative embodiments, the artifact segmentation system 102 expands the rectangle 304 beyond the edges of the dilated initial hole mask. For example, the artifact segmentation system 102 expands one or more edges of the rectangle 304 by a predetermined amount. In additional examples, the artifact segmentation system 102 expands one or more edges of the rectangle 304 by a random amount (e.g., a random number of pixels within a range of pixels). In some examples, the artifact segmentation system 102 expands one or more edges of the rectangle 304 to one or more edges of the synthetic training digital image 300 in response to determining that the dilated initial mask region is within a threshold number of pixels of the one or more edges of the synthetic training digital image 300.

In response to generating a dilated portion of the synthetic training digital image 300 (e.g., the rectangle 304), the artifact segmentation system 102 provides the synthetic training digital image 300 with the dilated portion to a plurality of client devices. Specifically, the artifact segmentation system 102 provides the synthetic training digital image 300 to client devices of a plurality of users for manual labeling of perceptual artifacts. For example, the artifact segmentation system 102 sends the synthetic training digital image 300 with a plurality of additional synthetic training digital images (with dilated indicators) for client devices and corresponding users to label perceptual artifacts on each of the digital images (e.g., based on user interaction with the perceptual artifacts).

In one or more embodiments, by dilating the synthetically modified portion 302 of the synthetic training digital image 300 for providing to client devices and corresponding users for labeling of perceptual artifacts, the artifact segmentation system 102 provides the synthetic training digital images without explicitly displaying the synthetically modified portions. More specifically, the artifact segmentation system 102 provides the synthetic training digital images without introducing bias into the labels. For instance, by providing the general regions of the synthetic training digital images for display at the client devices, the artifact segmentation system 102 prevents bias toward perceptual artifacts. Instead, presenting the general regions allows users to individually judge the locations of perceptual artifacts in digital image content.

In one or more embodiments, the artifact segmentation system 102 also provides an additional version of the synthetic training digital image 300 to the client devices. For instance, the artifact segmentation system 102 provides an unmarked copy/duplicate of the synthetic training digital image 300 to the client devices for display with the synthetic training digital image 300. To illustrate, by displaying two copies of the synthetic training digital image 300 the artifact segmentation system 102 provides a first digital image for labeling and a second digital image as a reference. Thus, a user can interact with the client device utilizing a stylus or other input device to label one or more artifact regions.

According to one or more embodiments, the artifact segmentation system 102 obtains a plurality of labeled images from a plurality of client devices. In particular, as illustrated in FIG. 3, the artifact segmentation system 102 receives a labeled training digital image 306 including a labeled artifact region 308 indicating one or more perceptual artifacts as marked by a user of a client device. To illustrate, the labeled artifact region 308 includes a portion of the labeled training digital image 306 marked via a stylus or other input tool at the client device. In additional embodiments, the artifact segmentation system 102 receives a plurality of labeled training digital images with labeled artifact regions from a plurality of client devices.

In connection with determining labeled artifact regions of synthetic digital images based on user interaction, the artifact segmentation system 102 also utilizes the artifact segmentation machine-learning model 112 to generate predicted perceptual artifact segmentations for digital images. For example, as illustrated in FIG. 3, the artifact segmentation system 102 utilizes the artifact segmentation machine-learning model 112 to generate a predicted perceptual artifact region 310 based on the synthetically modified portion 302 of the synthetic training digital image 300. As illustrated, the artifact segmentation system 102 generates the predicted perceptual artifact region 310 by labeling a region corresponding to a plurality of pixels of the synthetic training digital image 300 as including a perceptual artifact.

In one or more embodiments, the artifact segmentation system 102 utilizes the labeled artifact region 308 and the predicted perceptual artifact region 310 to train the artifact segmentation machine-learning model 112. For instance, the artifact segmentation system 102 determines a loss 312 based on a difference between the predicted perceptual artifact region 310 and the labeled artifact region 308. To illustrate, the artifact segmentation system 102 determines the loss 312 according to the pixel differences between the predicted perceptual artifact region 310 and the labeled artifact region 308.

The artifact segmentation system 102 then trains the artifact segmentation machine-learning model 112 based on the loss 312. In particular, the artifact segmentation system 102 utilizes the loss 312 to update parameters of the artifact segmentation machine-learning model 112 to cause the predicted perceptual artifact region 310 to be closer to the labeled artifact region 308. In additional embodiments, the artifact segmentation system 102 performs additional training iterations by generating updated predicted perceptual artifact regions and updated losses to further train the artifact segmentation machine-learning model 112. Furthermore, in one or more embodiments, the artifact segmentation system 102 generates the loss 312 based on a plurality of labeled artifact regions based on the synthetic training digital image 300 and/or a plurality of labeled artifact regions based on a plurality of synthetic training digital images.

Figure 4:
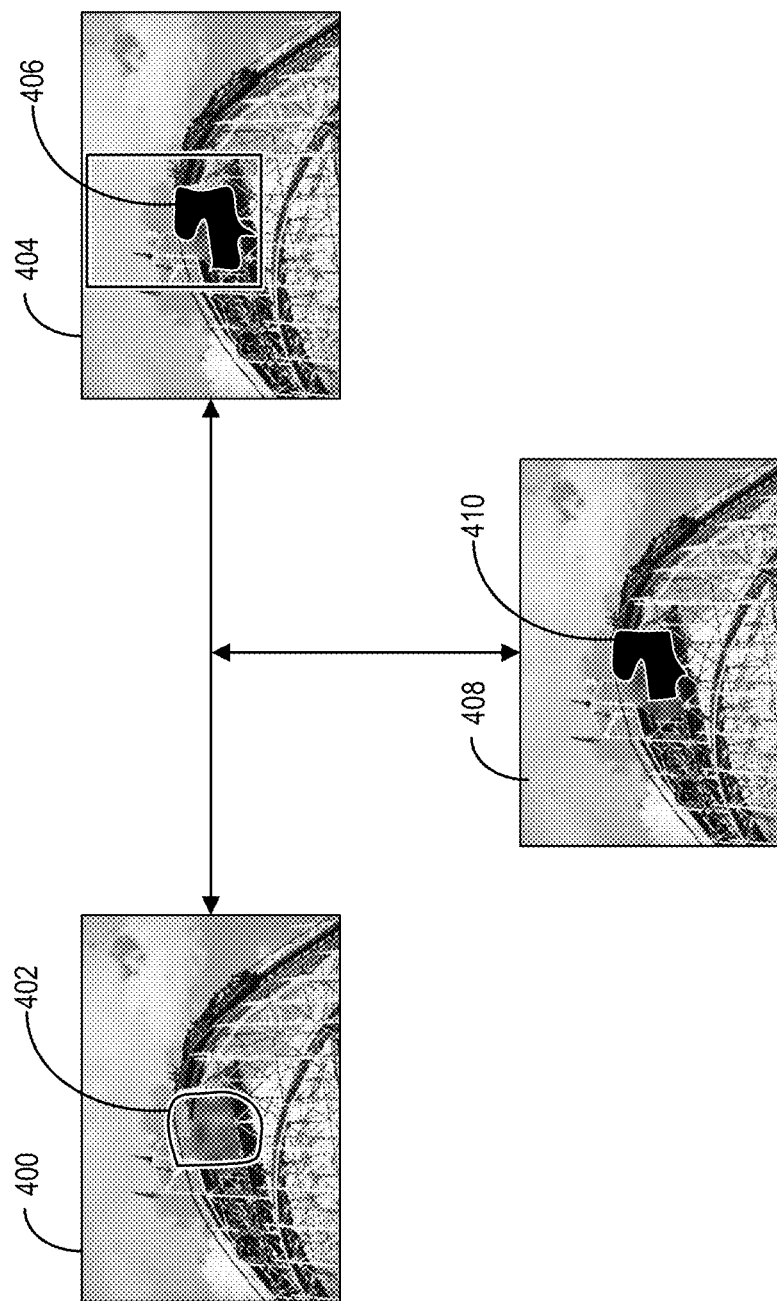
FIG. 4 illustrates a diagram of a process of the artifact segmentation system determining a labeled artifact region of a synthetic training digital image in accordance with one or more implementations.

Additionally, in some embodiments, the artifact segmentation system 102 modifies one or more labeled regions of labeled training digital images to correct for mislabeled areas. Specifically, FIG. 4 illustrates that the artifact segmentation system 102 modifies labeled artifact regions according to synthetically modified portions of digital images. For instance, the artifact segmentation system 102 determines a final label for a region based on whether artifacts are possible (e.g., due to synthetic digital image content) within the marked portions of a digital image.

In one or more embodiments, as illustrated in FIG. 4, the artifact segmentation system 102 determines a synthetic digital image 400 that includes a synthetically modified portion 402. For example, the synthetic digital image 400 includes the synthetically modified portion 402 based on an initial hole mask, or other mask associated with generating synthetic digital image content. The artifact segmentation system 102 also determines a labeled digital image 404 that includes a labeled artifact region 406. To illustrate, the labeled digital image 404 includes the labeled artifact region 406 based on user input marking a portion of the labeled digital image 404 at a separate client device.

According to one or more embodiments, the artifact segmentation system 102 determines an intersection based on the synthetically modified portion 402 and the labeled artifact region 406. In particular, the artifact segmentation system 102 determines a hole mask (e.g., an initial hole mask) corresponding to the synthetically modified portion 402. The artifact segmentation system 102 determines an intersection of the hole mask and the labeled artifact region 406 by determining a plurality of pixels from the labeled artifact region 406 that are located within a boundary of the hole mask (e.g., based on coordinates of the pixels corresponding to the hole mask and coordinates of the pixels corresponding to the labeled artifact region 406). In response to determining the intersection of the hole mask and the labeled artifact region 406, the artifact segmentation system 102 generates a synthetic training digital image 408 including a final labeled artifact region 410 based on the intersection.

In one or more additional embodiments, the artifact segmentation system 102 standardizes labeled artifact regions in synthetic training digital images. Specifically, due to the subjective nature of human perception, particularly with regard to perceptual artifacts in digital images, the artifact segmentation system 102 performs one or more verification steps for standardizing the labeled artifact regions. For instance, the artifact segmentation system 102 provides the labeled synthetic digital images to one or more additional users, such as a set of professional image users to cross check the labeled artifact regions of a given digital image and add or remove portions of the labeled artifact regions. Additionally, the artifact segmentation system 102 provides the labeled synthetic digital images to one or more additional users (e.g., an expert image user). By providing the labeled synthetic digital images to additional users, the artifact segmentation system 102 provides a process for correcting erroneous labels.

As previously mentioned, the artifact segmentation system 102 can utilize the artifact segmentation machine-learning model 112 to perform automatic detection of perceptual artifacts in a variety of digital image editing processes. According to one or more embodiments, the artifact segmentation system 102 utilizes the artifact segmentation machine-learning model 112 to automatically detect perceptual artifacts in an iterative inpainting process. For example, FIG. 5 illustrates a plurality of digital images in a digital image inpainting process.

In one or more embodiments, a digital image 500 is associated with a hole mask 502 corresponding to an object in a foreground of the digital image 500. As illustrated in FIG. 5, the hole mask 502 is overlaid on the digital image 500 based on a coordinate system of the digital image 500 and a similar coordinate system of the hole mask 502. In one or more embodiments, the hole mask 502 includes a hole region comprising pixels representing the object in the digital image 500. In additional embodiments, the hole mask 502 includes a buffer region surrounding the object.

According to one or more embodiments, the artifact segmentation system 102 or another system generates synthetic digital image content to replace the portion of the digital image 500 corresponding to the hole region of the hole mask 502. For example, the artifact segmentation system 102 utilizes a digital image inpainting model to generate synthetic digital image content to fill the hole region indicated by the hole mask 502. To illustrate, the artifact segmentation system 102 utilizes the digital image inpainting model to replace the object with synthetic digital image content by attempting to recreate the background behind the object. Thus, the artifact segmentation system 102 utilizes the digital image inpainting model to replace the object with a synthetically modified portion.

Figure 5:
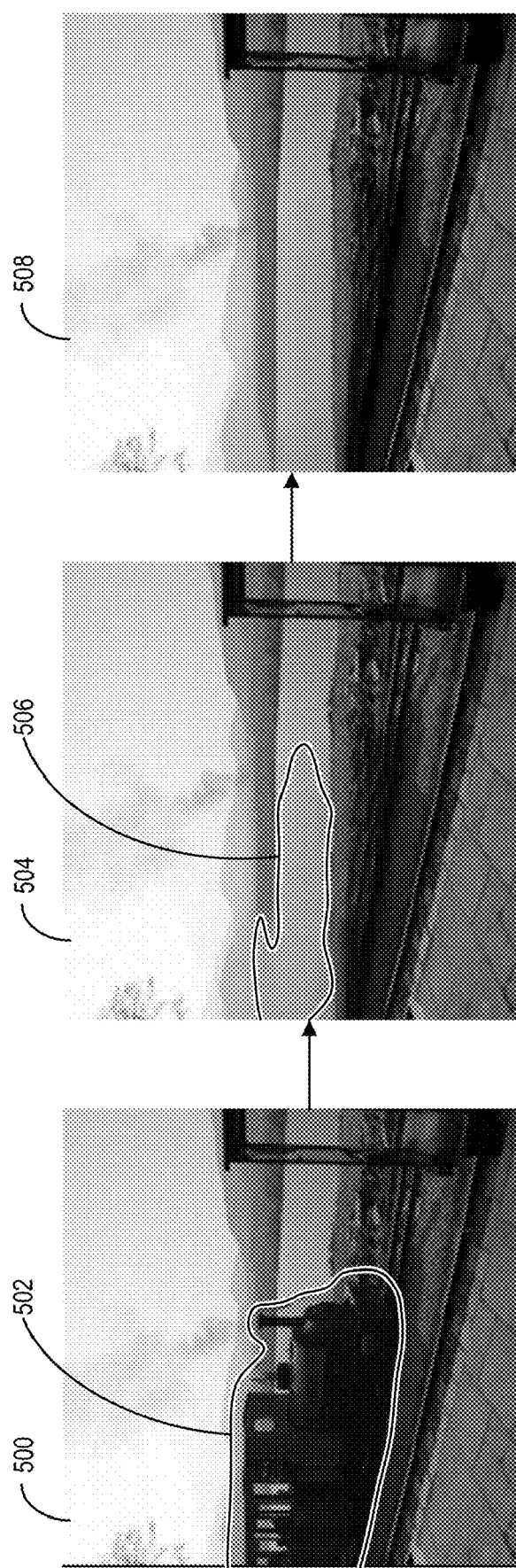
FIG. 5 illustrates digital images in an iterative digital image inpainting process in accordance with one or more implementations.

As illustrated in FIG. 5, the artifact segmentation system 102 generates a first modified digital image 504 including a synthetically modified portion in place of the portion of the digital image 500 indicated by the hole mask 502. Additionally, in one or more embodiments, the artifact segmentation system 102 utilizes an artifact segmentation machine-learning model to automatically detect perceptual artifacts within the synthetically modified portion of the first modified digital image 504. For example, the artifact segmentation system 102 utilizes the artifact segmentation machine-learning model to determine a predicted perceptual artifact region and generate an artifact segmentation 506 (e.g., and additional image mask including the artifact segmentation 506) corresponding to the predicted perceptual artifact region.

Furthermore, as illustrated in FIG. 5, the artifact segmentation system 102 performs one or more additional inpainting iterations to generate a final modified digital image 508. For instance, in response to generating the artifact segmentation 506, the artifact segmentation system 102 utilizes the digital image inpainting model (or a different digital image inpainting model) to generate additional synthetic digital image content within the portion of the first modified digital image 504 corresponding to the artifact segmentation 506. The artifact segmentation system 102 performs each inpainting iteration by replacing one or more portions of the digital image with synthetical digital image content utilizing one or more digital image inpainting models and determining whether the synthetically modified portions include perceptual artifacts utilizing the artifact segmentation machine-learning model. As shown in FIG. 5, the final modified digital image 508 is the result of five inpainting iterations, resulting in more realistic synthetic digital image content than in the first modified digital image 504 after a first inpainting iteration.

FIGS. 6A-6B illustrate a plurality of inpainting iterations in a digital image inpainting process. Specifically, FIG. 6A illustrates a first inpainting iteration for modifying a digital image 600 based on an initial hole mask 602. For example, the artifact segmentation system 102 determines the initial hole mask 602 based on user input selecting a region of the digital image 600. Alternatively, the artifact segmentation system 102 determines the initial hole mask 602 by utilizing an object detection neural network to identify an object in the digital image 600 and generate the initial hole mask 602.

In one or more embodiments, the artifact segmentation system 102 utilizes a digital image inpainting model 604a to fill in the portion of the digital image 600 indicated by the initial hole mask 602. For instance, as illustrated in FIG. 6A, the artifact segmentation system 102 utilizes the digital image inpainting model 604a to replace the original digital image content (e.g., an object) with a synthetically modified portion 606 in the digital image 600. Accordingly, the artifact segmentation system 102 utilizes the digital image inpainting model 604a to perform object removal in the digital image 600.

In response to generating the synthetically modified portion 606, the artifact segmentation system 102 utilizes the artifact segmentation machine-learning model 112 to determine whether the synthetically modified portion 606 includes perceptual artifacts. As illustrated in FIG. 6A, the artifact segmentation machine-learning model 112 processes the digital image 600 including the synthetically modified portion 606 to detect perceptual artifacts. To illustrate, the artifact segmentation system 102 utilizes the artifact segmentation machine-learning model 112 to determine a predicted perceptual artifact region 608 within the synthetically modified portion 606.

Additionally, in one or more embodiments, the artifact segmentation system 102 determines to continue performing one or more additional inpainting iterations based on the predicted perceptual artifact region 608. FIG. 6B illustrates a second inpainting iteration in which the artifact segmentation system 102 generates additional synthetical digital image content and detects additional perceptual artifacts. Specifically, the artifact segmentation system 102 determines an additional hole mask 610 including an artifact segmentation based on the predicted perceptual artifact region 608.

In one or more embodiments, the artifact segmentation system 102 utilizes a digital image inpainting model 604b to generate additional synthetic digital image content based on the additional hole mask 610. As illustrated in FIG. 6B, the artifact segmentation system 102 utilizes the digital image inpainting model 604b to fill the portion of the digital image 600 corresponding to the additional hole mask 610 with an additional synthetically modified portion 612. For example, the artifact segmentation system 102 utilizes the digital image inpainting model 604b to further refine details and fix errors introduced in the synthetically modified portion 606 in the first inpainting iteration.

Figure 8A:
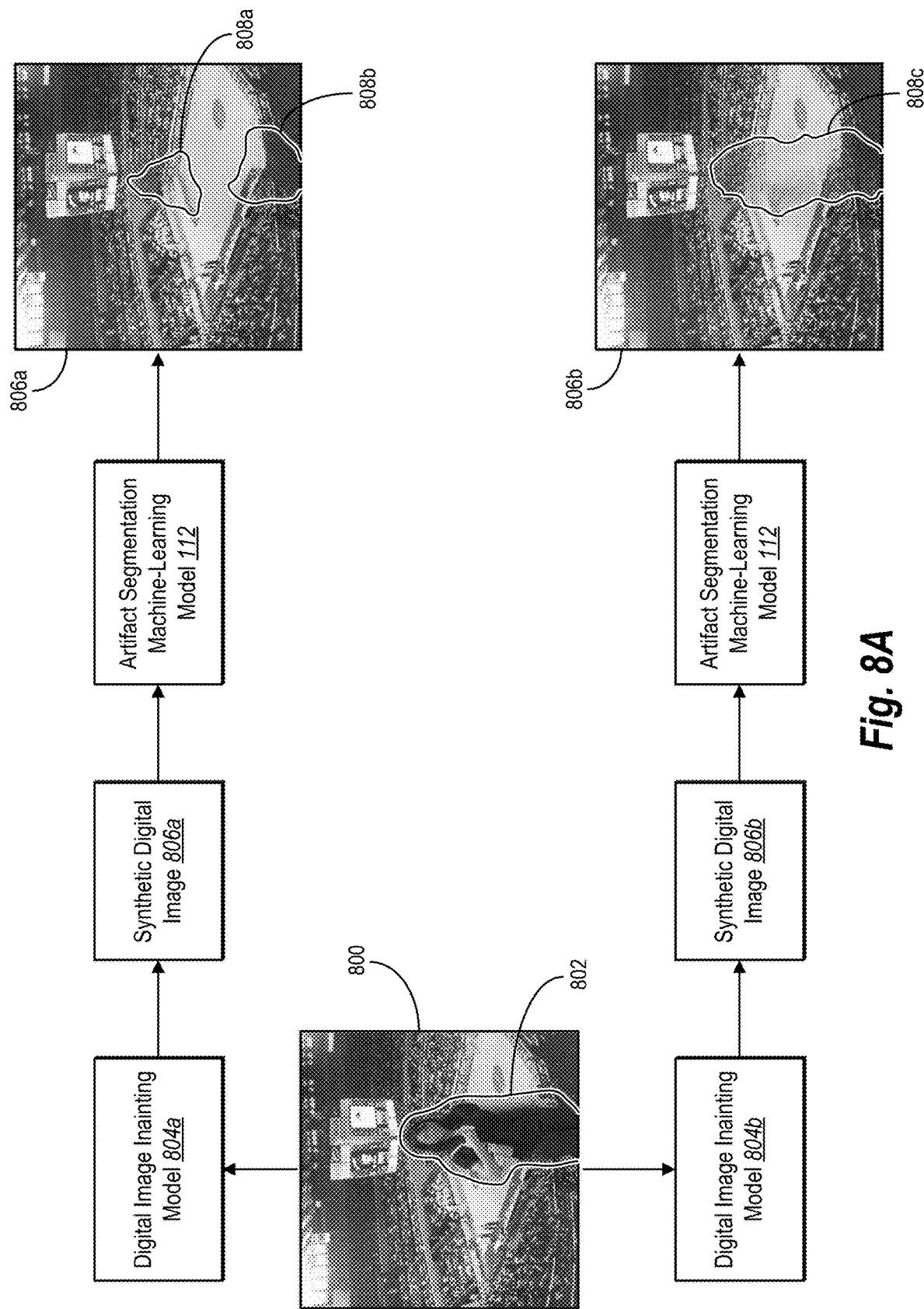
FIGS. 8A-8B illustrate diagrams of the artifact segmentation system selecting a digital image inpainting model based on performance of a plurality of digital image inpainting models in accordance with one or more implementations.
Figure 8B:
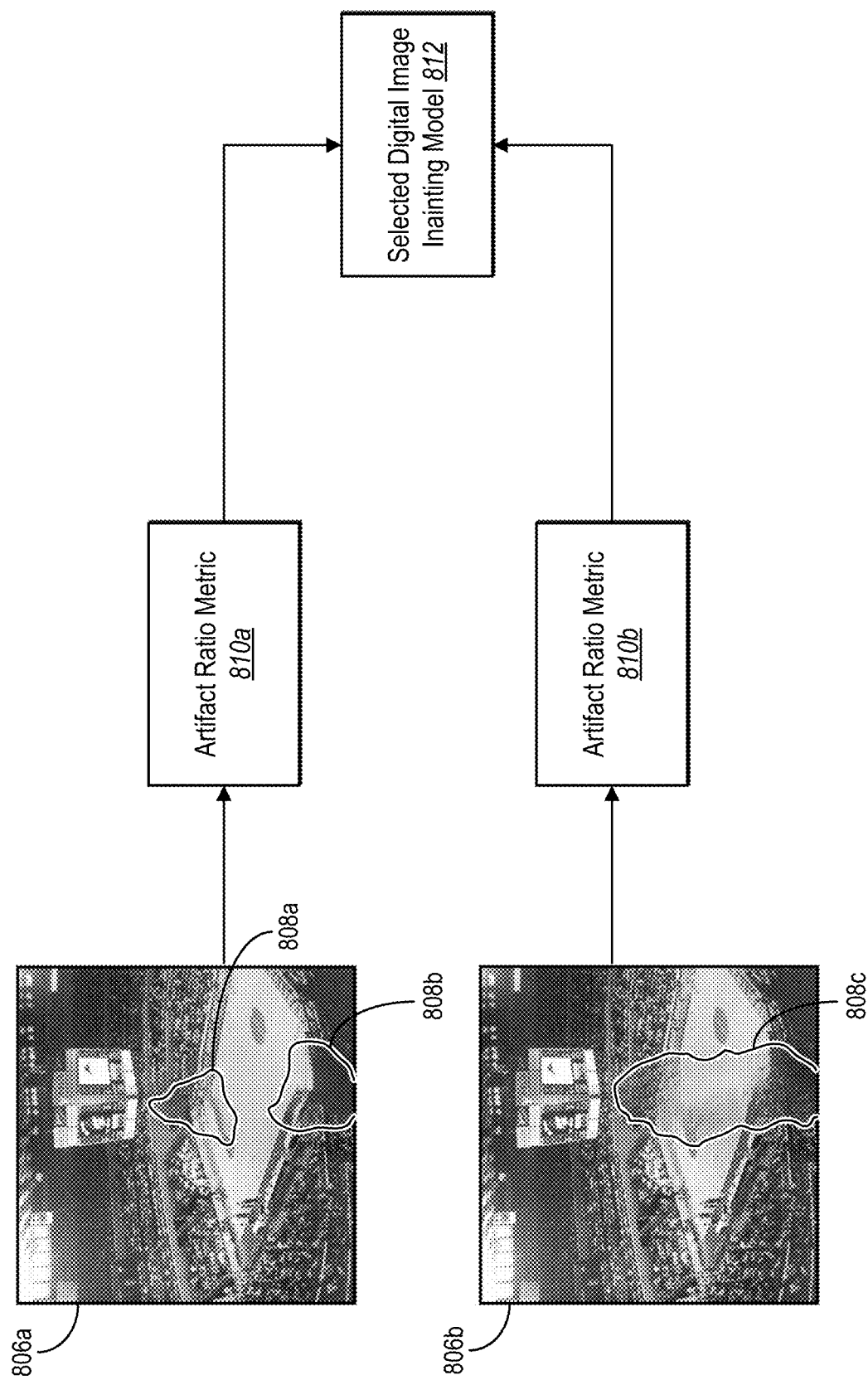
Figure 9:
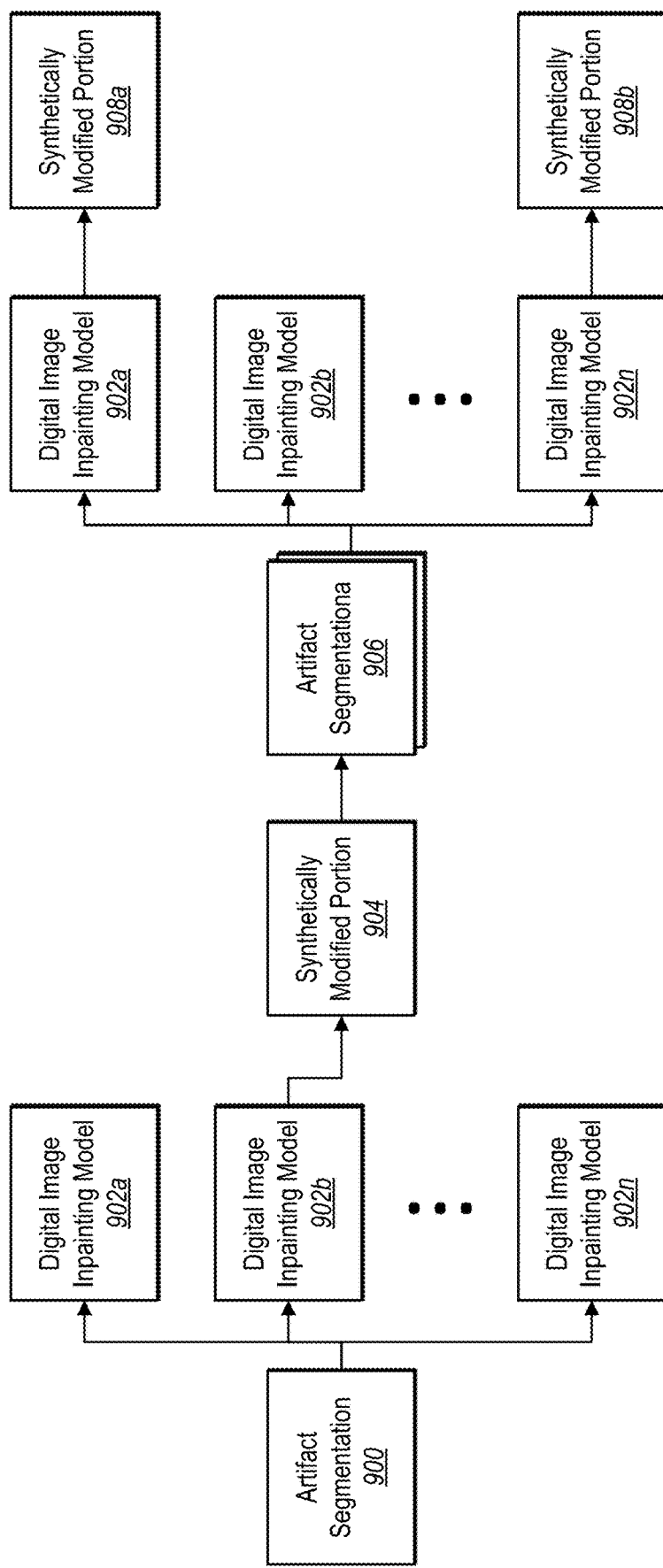
FIG. 9 illustrates a diagram of the artifact segmentation system performing an iterative digital image inpainting process utilizing a plurality of digital image inpainting models in accordance with one or more implementations.

According to one or more embodiments, the digital image inpainting model 604b is the same model as the digital image inpainting model 604a. In alternative embodiments, the digital image inpainting model 604b is different than the digital image inpainting model 604b. FIGS. 8A-8B and 9 and the corresponding description provide additional detail with respect to utilizing a plurality of digital image inpainting models in a digital image inpainting process.

As illustrated in FIG. 6B, the artifact segmentation system 102 utilizes the artifact segmentation machine-learning model 112 to determine whether the additional synthetically modified portion 612 contains perceptual artifacts. In one or more embodiments, the artifact segmentation machine-learning model 12 processes the digital image 600 including the additional synthetically modified portion 612 within the synthetically modified portion 606. The artifact segmentation system 102 utilizes the artifact segmentation machine-learning model 112 to determine an additional predicted perceptual artifact region 614 within the additional synthetically modified portion 612.

In one or more embodiments, the artifact segmentation system 102 continues performing inpainting iterations in a digital image inpainting process to reduce perceptual artifacts in the digital image 600. For instance, the artifact segmentation system 102 determines a number of inpainting iterations to perform based on perceptual artifacts detected in the digital image. Specifically, the artifact segmentation system 102 generates an artifact ratio metric that indicates a ratio of the combined size of perceptual artifacts relative to the size of a digital image mask corresponding to a synthetically modified portion.

For example, after each inpainting iteration, the artifact segmentation system 102 determines the artifact ratio metric based on the size of detected perceptual artifacts relative to the size of an input hole for the current iteration. To illustrate, the artifact segmentation system 102 determines a first artifact ratio metric based on the size of the predicted perceptual artifact region 608 relative to the size of the initial hole mask 602. The artifact segmentation system 102 also determines a second artifact ratio metric based on the size of the additional predicted perceptual artifact region 614 relative to the size of the additional hole mask 610.

In one or more embodiments, the artifact segmentation system 102 determines whether to perform an additional inpainting iteration based on an artifact ratio metric of a previous iteration. For instance, the artifact segmentation system 102 compares the artifact ratio metric of an inpainting iteration to a ratio threshold to determine whether to perform an additional iteration. To illustrate, in response to determining that the first artifact ratio metric for the first iteration of FIG. 6A meets the ratio threshold (e.g., the combined size of the perceptual artifacts relative to the input hole is at least as high as a predetermined ratio), the artifact segmentation system 102 performs the second iteration of FIG. 6B. Additionally, in response to determining that the second artifact ratio metric for the second ratio does not meet the ratio threshold, the artifact segmentation system 102 terminates the digital image inpainting process and determines a final version of the digital image.

Figure 7:
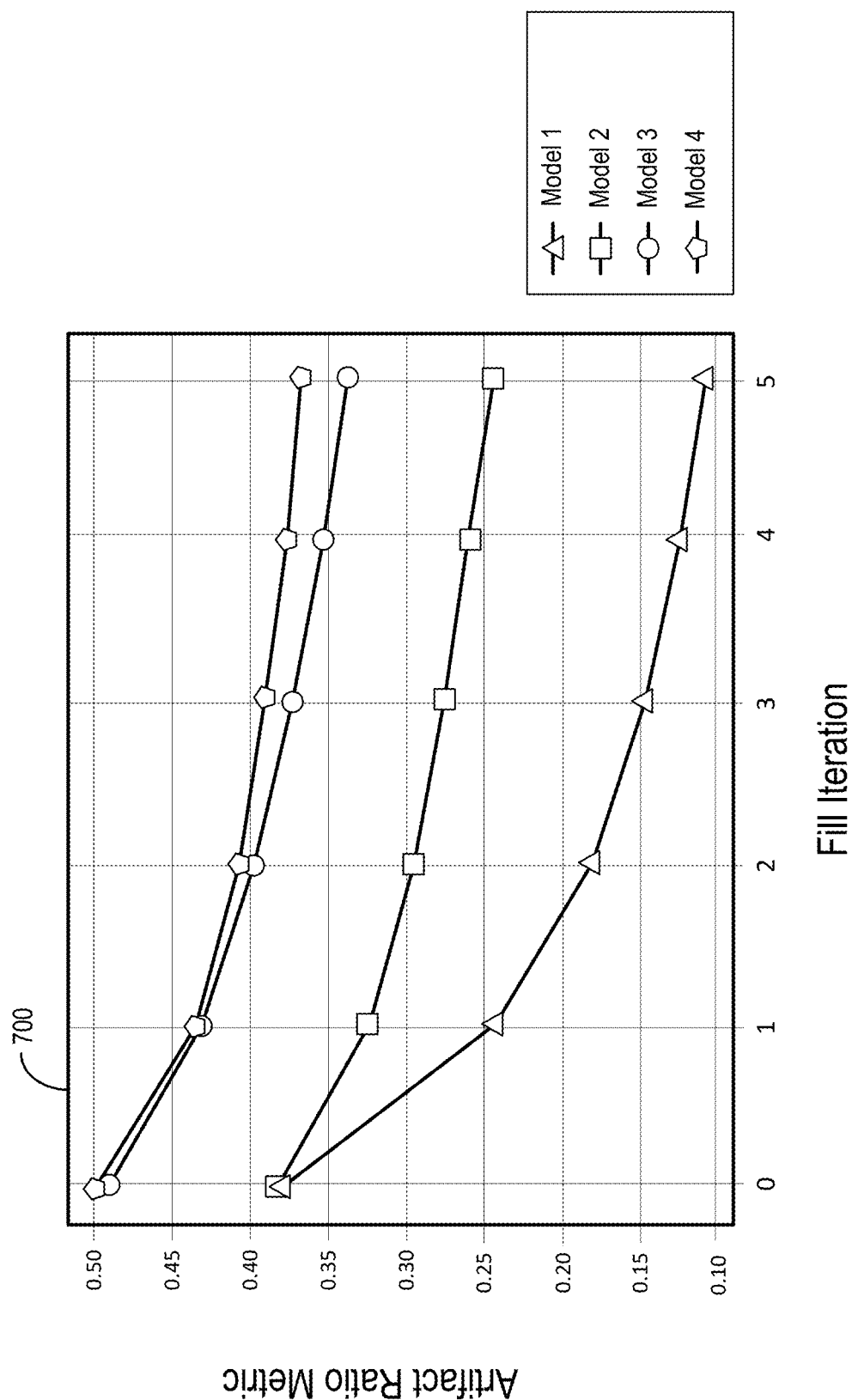
FIG. 7 illustrates a graph diagram of a comparison of artifact ratio metrics relative to digital image inpainting iterations in accordance with one or more implementations.

In additional embodiments, the artifact segmentation system 102 determines a number of digital image inpainting operations to perform based on additional considerations. For example, FIG. 7 illustrates a graph diagram 700 comparing the number of inpainting iterations to artifact ratio metrics for different digital image inpainting models. As shown, performing additional inpainting iterations continually reduces the artifact ratio metrics for all of the different digital image inpainting models. For example, as illustrated, performing five iterative inpainting operations reduces the artifact ratio metric. In additional embodiments, performing additional iterative inpainting operations further reduces the artifact ratio metric.

FIG. 7 also illustrates that additional inpainting iterations reduces the artifact ratio metrics by different amounts for the different digital image inpainting models. Accordingly, in one or more embodiments, the artifact segmentation system 102 determines a number of inpainting iterations based on one or more digital image inpainting models used in the digital image inpainting process for a given digital image. In some instances, the artifact segmentation system 102 also determines a number of inpainting iterations based on a computing budget, available computing resources, a time budget, a size of the digital image, pixel sizes of the perceptual artifacts, or other criteria.

In one or more embodiments, the artifact segmentation system 102 also utilizes artifact ratio metrics to perform additional operations associated with digital image inpainting processes or other digital image editing processes. For example, FIGS. 8A-8B illustrate the artifact segmentation system 102 selecting a particular model for a digital image inpainting process. In particular, the artifact segmentation system 102 utilizes artifact ratio metrics to test the performance of a plurality of digital image inpainting models for use with a particular digital image or a particular inpainting iteration.

In one or more embodiments, as illustrated in FIG. 8A, the artifact segmentation system 102 utilizes a plurality of digital image inpainting models to fill in a portion of digital image 800. Specifically, the digital image 800 is associated with a digital image mask 802 that indicates one or more portions of the digital image 800 to replace with synthetic digital image content. The artifact segmentation system 102 utilizes a first digital image inpainting model 804a and a second digital image inpainting model 804b to process the digital image 800 by generating synthetic digital image content based on the digital image mask 802.

According to one or more embodiments, the first digital image inpainting model 804a generates a first synthetic digital image 806a including a first synthetically modified portion corresponding to the portion indicated by the digital image mask 802. Additionally, the second digital image inpainting model 804b generates a second synthetic digital image 806b including a second synthetically modified portion corresponding to the portion indicated by the digital image mask 802. Because the first digital image inpainting model 804a is different than the second digital image inpainting model 804b (e.g., includes different neural network layers and/or utilizes different inpainting processes), the first synthetic digital image 806a is different than the second synthetic digital image 806b.

Furthermore, as illustrated in FIG. 8A, the artifact segmentation system 102 utilizes the artifact segmentation machine-learning model 112 to detect perceptual artifacts in the synthetically modified portions. In particular, the artifact segmentation machine-learning model 112 determines a first predicted perceptual artifact region 808a and a second predicted perceptual artifact region 808b from the first synthetic digital image 806a. Additionally, the artifact segmentation machine-learning model 112 determines a third predicted perceptual artifact region 808c from the second synthetic digital image 806b. As illustrated, utilizing different digital image inpainting models to generate synthetic digital image content results in different perceptual artifacts—in both size and location.

FIG. 8B illustrates that the artifact segmentation system 102 compares the perceptual artifacts of the synthetic digital images utilizing artifact ratio metrics. Specifically, the artifact segmentation system 102 determines a first artifact ratio metric 810a based on the first predicted perceptual artifact region 808a and the second predicted perceptual artifact region 808b of the first synthetic digital image 806a. For example, the artifact segmentation system 102 determines a combined size (e.g., a number of pixels, a size based on percentage of the digital image 800, or other size metric) of the first predicted perceptual artifact region 808a and the second predicted perceptual artifact region 808b. The artifact segmentation system 102 determines the first artifact ratio metric 810a by comparing the combined size of the predicted perceptual artifact regions to a size of the digital image mask 802.

The artifact segmentation system 102 also determines a second artifact ratio metric 810b based on the third predicted perceptual artifact region 808c of the second synthetic digital image 806b. For instance, the artifact segmentation system 102 determines a size of the third predicted perceptual artifact region 808c. The artifact segmentation system 102 also determines the second artifact ratio metric 810b by comparing the size of the third predicted perceptual artifact region 808c to the size of the digital image mask 802.

In one or more embodiments, the artifact segmentation system 102 compares the artifact ratio metrics of a plurality of synthetic digital images. Specifically, as illustrated in FIG. 8B, the artifact segmentation system 102 determines a selected digital image inpainting model 812 based on the first artifact ratio metric 810a and the second artifact ratio metric 810b. To illustrate, the artifact segmentation system 102 selects the first digital image inpainting model 804a in response to the first artifact ratio metric 810a being lower than the second artifact ratio metric 810b. Because different digital image inpainting models may perform better with certain types of digital image content (e.g., object types such as man-made objects or natural objects, resolutions, high/low image frequencies) or hole sizes (e.g., masked portions in digital image masks), the artifact ratio metrics for digital image inpainting models may better or worse depending on the specific digital image.

While FIG. 8B illustrates the artifact segmentation system 102 selecting a digital image inpainting model from two separate digital image inpainting models, the artifact segmentation system 102 can alternatively select from any number of digital image inpainting models. In additional embodiments, the artifact segmentation system 102 utilizes artifact ratio metrics for other types of digital image editing processes. For example, the artifact segmentation system 102 determines artifact ratio metrics for full digital images generated by generative adversarial neural networks or other image generation neural networks.

In one or more additional embodiments, the artifact segmentation system 102 selects a digital image inpainting model from a plurality digital image inpainting models for performing digital image inpainting processes. FIG. 9 illustrates an example in which the artifact segmentation system 102 selects from a plurality of digital image inpainting models for generating synthetic digital image content. Specifically FIG. 9 illustrates the artifact segmentation system 102 selecting from the plurality of models at each separate inpainting iteration.

According to one or more embodiments, as illustrated in FIG. 9, the artifact segmentation system 102 determines an artifact segmentation 900 for a digital image. To illustrate, the artifact segmentation system 102 utilizes an artifact segmentation machine-learning model to determine the artifact segmentation from previously generated synthetic digital image content in the digital image. Although FIG. 9 illustrates that the artifact segmentation system 102 determines the artifact segmentation 900, the artifact segmentation system 102 alternatively determines an initial hole mask indicating one or more portions of the digital image.

In response to determining the artifact segmentation 900, the artifact segmentation system 102 selects from a plurality of digital image inpainting models 902a-902n to generate a synthetically modified portion 904 based on the artifact segmentation 900. In one or more embodiments, the artifact segmentation system 102 generates a plurality of separate synthetically modified portions for the artifact segmentation 900 utilizing the plurality of digital image inpainting models 902a-902n. The artifact segmentation system 102 utilizes the synthetically modified portions to select a particular digital image inpainting model (e.g., digital image inpainting model 902b) based on the quality of the synthetically modified portions. To illustrate, the artifact segmentation system 102 determines artifact ratio metrics for each synthetically modified portion and selects the digital image inpainting model based on the lowest artifact ratio metric (e.g., by utilizing the synthetically modified portion 904 generated utilizing the selected model).

In additional embodiments, as illustrated in FIG. 9, the artifact segmentation system 102 determines a plurality of artifact segmentations 906 based on the synthetically modified portion 904. For example, the artifact segmentation system 102 utilizes an artifact segmentation machine-learning model (e.g., the artifact segmentation machine-learning model 112 of FIG. 1) to determine predicted perceptual artifact regions within a boundary of the synthetically modified portion 904. The artifact segmentation system 102 generates one or more digital image masks including the artifact segmentations 906 based on the predicted perceptual artifact regions.

According to one or more embodiments, the artifact segmentation system 102 utilizes the plurality of artifact segmentations 906 to perform an additional inpainting iteration. Specifically, as illustrated in FIG. 9, the artifact segmentation system 102 selects from the plurality of digital image inpainting models 902a-902n to generate synthetic digital image content based on the artifact segmentations 906. For instance, the artifact segmentation system 102 utilizes one or more of the plurality of digital image inpainting models 902a-902n to generate synthetic modified digital image content for each portion of the digital image corresponding to the artifact segmentations 906.

In one or more embodiments, the artifact segmentation system 102 selects two or more of the digital image inpainting models 902a-902n in a single inpainting iteration. For example, the artifact segmentation system 102 determines a performance of each digital image inpainting model for each of the portions of the digital image corresponding to the artifact segmentations 906. To illustrate, the artifact segmentation system 102 determines artifact ratio metrics for each of the portions of the digital image and for each of the digital image inpainting models 902-902n.

As shown in FIG. 9, the artifact segmentation system 102 selects digital image inpainting model 902a to generate a first synthetically modified portion 908a for a first artifact segmentation of the artifact segmentations 906. Additionally, the artifact segmentation system 102 selects digital image inpainting model 902n to generate a second synthetically modified portion 908b for a second artifact segmentation of the artifact segmentations 906. Accordingly, for each inpainting iteration, and for each artifact segmentation, the artifact segmentation system 102 selects from a plurality of digital image inpainting models based on the performance of each digital image inpainting models. Thus, the artifact segmentation system 102 provides improved accuracy of a digital image inpainting process by selecting the best performing digital image inpainting operation at each step of the process.

Figure 10:
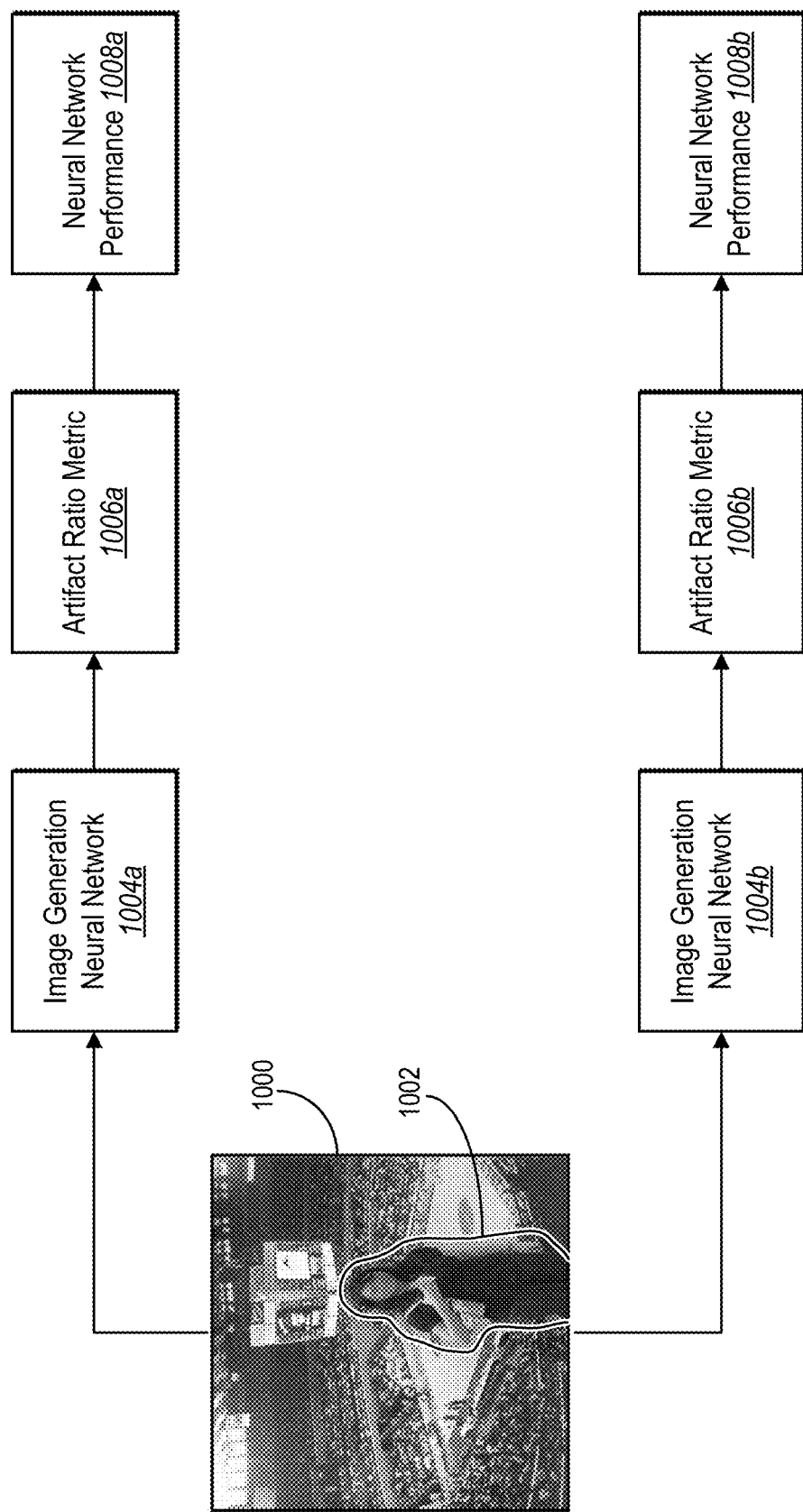
FIG. 10 illustrates a diagram of the artifact segmentation system comparing performance of image generation neural networks in accordance with one or more implementations.

In one or more embodiments, the artifact segmentation system 102 also utilizes artifact ratio metrics to compare performances of different machine-learning models. For example, FIG. 10 illustrates an embodiment of the artifact segmentation system 102 comparing the performance of two separate image generation neural networks for a digital image. Specifically, FIG. 10 illustrates a neural network performance comparisons for generating synthetic digital image content within a digital image 1000 based on a digital image mask 1002.

According to one or more embodiments, the artifact segmentation system 102 utilizes a first image generation neural network 1004a to generate first synthetic digital image content for the digital image 1000 based on the digital image mask 1002. Additionally, the artifact segmentation system 102 utilizes a second image generation neural network 1004b to generate second synthetic digital image content for the digital image 1000 based on the digital image mask 1002. In alternative embodiments, the artifact segmentation system 102 utilizes the first image generation neural network 1004a and the second image generation neural network 1004b to generate other types of synthetic digital image content, such as based on a label map.

The artifact segmentation system 102 determines artifact ratio metrics based on the synthetic digital image content generated by the image generation neural networks. In particular, the artifact segmentation system 102 determines a first artifact ratio metric 1006a based on the synthetic digital image content generated by the first image generation neural network 1004a. Additionally, the artifact segmentation system 102 determines a second artifact ratio metric 1006b based on the synthetic digital image content generated by the second image generation neural network 1004b.

Furthermore, as illustrated in FIG. 10, the artifact segmentation system 102 determines performances of the image generation neural networks based on the artifact ratio metrics. For example, the artifact segmentation system 102 utilizes the first artifact ratio metric 1006a to determine a first neural network performance 1008a corresponding to the first image generation neural network 1004a. Additionally, the artifact segmentation system 102 utilizes the second artifact ratio metric 1006b to determine a second neural network performance 1008b corresponding to the second image generation neural network 1004b.

In one or more embodiments, the artifact segmentation system 102 determines the performances of the image generation neural networks by comparing the artifact ratio metrics. In particular, the artifact segmentation system 102 determines the neural network performances as relative neural network performances based on the comparison of the artifact ratio metrics. Alternatively, the artifact segmentation system 102 determines the neural network performances based on an objective value (e.g., a ratio threshold or a predetermined ratio value).

In additional embodiments, the artifact segmentation system 102 determines a quality of an inpainted digital image by utilizing an artifact ratio metric in combination with one or more additional processes. To illustrate, the artifact segmentation system 102 utilizes the artifact ratio metric in combination with a neural network or machine-learning model in a curation system as described in U.S. application Ser. No. 17/664,991 titled "GENERATING MODIFIED DIGITAL IMAGES VIA IMAGE INPAINTING USING MULTI-GUIDED PATCH MATCH AND INTELLIGENT CURATION," which is herein incorporated by reference in its entirety, to compare a plurality of candidate inpainting results from a set of image guides and select an inpainted digital image from among the results via comparisons and contrasts between candidates. For example, the artifact segmentation system 102 selects a particular candidate as an inpainted digital image by combining (e.g., adding, multiplying, or using an additional neural network) a score generated by a curation system and a score corresponding to an artifact ratio metric.

According to one or more embodiments, the artifact segmentation system 102 utilizes the neural network performances to determine which image generation neural network (e.g., corresponding to a particular inpainted digital image) to use for a digital image editing process. For instance, as previously mentioned, the artifact segmentation system 102 utilizes the neural network performances to select a particular image generation neural network for use in a digital image inpainting process. In additional embodiments, the artifact segmentation system 102 utilizes the neural network performances to select a particular image generation neural network for use in generating training data for training a neural network (e.g., the image generation neural networks, an object detection neural network, or other machine-learning model).

Figure 11:
FIG. 11 illustrates a graphical user interface for displaying detected artifact segmentations in a digital image in accordance with one or more implementations.

In one or more embodiments, the artifact segmentation system 102 provides information associated with artifact detection to a client device. FIG. 11 illustrates a graphical user interface for providing indications of artifact segmentations in connection with synthetic digital image content. Specifically, FIG. 11 illustrates a graphical user interface of a client device 1100 including a client application 1102 (e.g., a digital image application) for providing information associated with a digital image editing and/or inpainting process. For instance, the artifact segmentation system 102 can provide an indication of artifact segmentations to aid a client device in identifying areas of a digital image for additional editing.

In one or more embodiments, in response to performing a digital image editing or inpainting process for a digital image, the artifact segmentation system 102 provides a first version 1104a of the digital image including an indication of a masked portion 1106. For example, the client device 1100 displays the first version 1104a including synthetically generated digital image content in a portion of the digital image in connection with removing an object from the foreground of the digital image. To illustrate, the artifact segmentation system 102 utilizes a digital image inpainting model to remove and/or replace the object with a synthetically modified portion according to the masked portion 1106.

In additional embodiments, the artifact segmentation system 102 utilizes an artifact segmentation machine-learning model to detect perceptual artifacts within the synthetically modified portion of the digital image. The artifact segmentation system 102 determines an artifact segmentation 1108 based on a predicted perceptual artifact region generated by the artifact segmentation machine-learning model. The client device 1100 displays the artifact segmentation 1108 overlaid on a second version 1104b of the digital image within the graphical user interface.

In one or more embodiments, the artifact segmentation system 102 also determines an artifact ratio metric in connection with determining the artifact segmentation 1108. For example, the artifact segmentation system 102 determines the artifact ratio metric based on a size of the artifact segmentation 1108 relative to a size of the masked portion 1106. In one or more embodiments, the artifact segmentation system 102 provides an indication of the artifact ratio metric for display at the client device 1100.

In additional embodiments, the artifact segmentation system 102 compares the artifact ratio metric to a ratio threshold and provides an indication of the comparison for display at the client device 1100. To illustrate, the artifact segmentation system 102 provides a recommendation to perform additional image editing operations based on the comparison of the artifact ratio metric to the ratio threshold. In one or more embodiments, the client device 1100 also provides an option to perform an additional image editing operation (e.g., an additional inpainting iteration) based on the comparison. In one or more additional embodiments, the client device 1100 also provides image editing tools for editing the indicated portions of the digital image within the artifact segmentation 1108 (e.g., based on user interactions with the client device 1100).

Although FIGURE illustrates the first version 1104a and the second version 1104b, in some embodiments, the artifact segmentation system 102 provides only a single version (e.g., the second version 1104b) for display. For example, the artifact segmentation system 102 can analyze an edited digital image, identify an artifact segmentation, and display the artifact segmentation to a client device to highlight one or more regions for additional editing.

In one or more embodiments, the artifact segmentation system 102 also provides data associated with a plurality of image generation neural networks. For example, the artifact segmentation system 102 utilizes a plurality of image generation neural networks (e.g., digital image inpainting models) to generate separate synthetically modified portions based on the masked portion 1106. The artifact segmentation system 102 determines separate artifact ratio metrics for the separate synthetically modified portions and provides indications of the artifact ration metrics (or indications of performances of the image generation neural networks) for display at the client device. In one or more embodiments, the artifact segmentation system 102 selects an image generation neural network to use for the current or future image editing operations in response to a detected selection of a particular neural network in connection with the displayed information.

In further embodiments, the artifact segmentation system 102 provides the synthetically modified portions for display at the client device 1100. For example, the artifact segmentation system 102 generates separate synthetically modified portions for a single digital image based on a masked portion and provides the synthetically modified portions for display at the client device 1100. In response to the client device 1100 detecting a selection of one of the synthetically modified portions, the artifact segmentation system 102 utilizes the digital image with the selected synthetically modified portion as a final modified image or for subsequent image editing operations.

Moreover, although FIG. 11 illustrates a particular example of providing artifact segmentations for display, the artifact segmentation system 102 can provide artifact segmentations for display in a variety of applications or other use cases. For example, in some implementations, the artifact segmentation system 102 can be implemented as part of a web browser or social media application to identify digital images/videos that have been modified or altered (e.g., deep-fake images/videos). Indeed, the artifact segmentation system 102 can analyze a digital image posted on a website or social media feed, generate a predicted artifact segmentation, and provide the predicted artifact segmentation for display (e.g., as an overlay to the digital image). Similarly, the artifact segmentation system 102 can provide an artifact ratio metric for display via the web browser and/or social media application. The artifact segmentation system 102 can similarly operate in a variety of other computer applications (e.g., digital communication applications, such as email, chat, instant messaging, or chat applications).

In various embodiments, the artifact segmentation system 102 utilizes a plurality of different neural network configurations for the artifact segmentation machine-learning model. Specifically, according to experiments performed by experimenters, various image evaluation metrics provide similar performance for different neural network configurations. To illustrate, as in Table 1 below, a first neural network configuration for the artifact segmentation machine-learning model includes a ResNet-50 backbone and a HRNet head, a second neural network configuration includes a Swin-L backbone and a Uper head, and a third neural network configuration includes a ResNet-50 backbone and a PSPNet head. ResNet-50 includes a neural network as described by Kaiming He, Xiangyu, Zhang, Shaoqing Ren, and Jian Sun in "Deep residual learning for image recognition" in CVPR (2015). HRNet includes a neural network as described by Jingdong Wang, Ke Sun, Tianheng Cheng, Borui Jian, Chaorui Deng, Yang Zhao, Dong Liu, Yadong Mu, Mingkui Tan, Xinggang Wang, Wenyu Liu, and Bin Xiao in "Deep high-resolution representation learning for visual recognition" in CVPR (2019). Uper includes neural network as described by Tete Xiao, Yingcheng Liu, Bolei Zhou, Yuning Jiang, and Jian Sun in "Unified perceptual parsing for scene understanding" in CVPR (2018). PSPNet includes a neural network as described by Hengshuang Zhao, Jianping Shi, Xiaojuan Qi, Xiaogang Wang, and Jiaya Jia in "Pyramid scene parsing network" in CVPR (2016). The above references are incorporated herein by reference in their entirety.

| Model | IoU | Precision | Recall | Fscore |
|---|---|---|---|---|
| ResNet-50 + HRNet | 41.35 | 58.45 | 58.56 | 58.51 |
| Swin-L + Uper | 44.20 | 63.01 | 59.69 | 61.30 |
| ResNet-50 + PSPNet | 46.04 | 59.78 | 66.71 | 63.05 |
| Human Subject A | 45.60 | 75.07 | 53.73 | 62.64 |
| Human Subject B | 42.21 | 60.40 | 58.36 | 59.36 |
| Human Subject C | 36.85 | 61.47 | 47.93 | 53.86 |

"IoU" ("Intersection over Union"), "precision," "recall" and "F score" refer to various evaluation metrics for object detection and synthetic digital image content benchmarking. As shown in Table 1, while the third neural network configuration provides marginally better performance in the various evaluation metrics, the different neural network configurations may provide different tradeoffs in terms of complexity and required computing resources. Accordingly, according to one or more embodiments, the artifact segmentation system 102 utilizes the first neural network configuration for the artifact segmentation machine-learning model due to simplicity and efficiency of the neural network configuration.

Furthermore, in various embodiments, the artifact segmentation system 102 determines a training dataset of digital images including synthetically modified portions for training the artifact segmentation machine-learning model. Specifically, in some embodiments, the artifact segmentation system 102 includes a plurality of digital images that have no perceptual artifacts or minor perceptual artifacts in the training dataset. In one or more embodiments, the artifact segmentation system 102 also includes a plurality of real images (e.g., without synthetically modified portions) with empty masks in the training dataset. In some embodiments, the artifact segmentation system 102 also determines pretrained weights for parameters of the artifact segmentation machine-learning model to improve performance of the artifact segmentation machine-learning model in connection with training via the training dataset.

In one or more embodiments, the artifact segmentation system 102 provides unlabeled digital images with pseudo labels (e.g., enlarged masks covering artifact regions) for pretraining the artifact segmentation machine-learning model. In particular, the artifact segmentation system 102 utilizes a pretrained artifact segmentation machine-learning model to generate artifact segmentations on a plurality of unlabeled digital images and then enlarges the artifact segmentations by a random number of dilation iterations to cover the perceptual artifacts regions. This pretraining step improves performance of the artifact segmentation machine-learning model.

Furthermore, the experimenters also performed experiments to compare performance of the artifact segmentation system 102 with human subjects. Specifically, Table 1 indicates a performance of "Human subject A," which is a person who has experience in labeling perceptual artifacts (but not on the currently tested images) and performances of "Human subject B" and "Human subject C," which are people who have never worked on a perceptual artifact labeling task but have been taught based on labeled examples. As shown, the artifact segmentation system 102 performs comparable to, or better than, the human subjects.

Table 2 below includes comparisons of the artifact ratio metrics relative to human perception based on user preferences on filled images between four pairs of inpainting methods. Table 2 indicates two comparisons between pairs of two strong digital image inpainting models in the first two rows. Table 2 also indicates two comparisons between pairs including a strong digital image inpainting model and a relatively weak digital image inpainting model in the following two rows. In each comparison, the experimenters displayed two filled images with randomized order to users and asked the users to pick the preferred image out of the two options. Additionally, the experimenters determined that a filled image is strongly preferred over the other only if at least four out of the five users reached an agreement. The experiment used the strongly preferred image pairs as human preference ground truth to reduce the noise as much as possible, in which the number of strongly preferred cases are shown in the second column of Table 2.

As indicated in Table 2 below, "PSNR" refers to peak signal-to-noise ratio. "LPIPS" refers to a metric as described by Richard Zhang, Phillip Isola, Alexei, Efros, Eli Shechtmann, and Oliver Wang in "The unreasonable effectiveness of deep features as a perceptual metric" in CVPR (2018). "HyperIQA" refers to a metric as described by Shaolin Su, Qingsen Yan, Yu Zhu, Cheng Zhang, Xin Ge, Jinqiu Sun, and Yanning Zhang in "Blindly assess image quality in the wild guided by a self-adaptive hyper network" in CVPR (2020). "MUSIQ" refers to a metric as described by Junjie Ke, Qifei Wang, Yilin Wang, Peyman Milanfar, and Feng Yang in "MUSIQ: Multi-scale image quality transformer" in CVPR (2021). "System 102" refers to the artifact ratio metric determined by the artifact segmentation system 102 as described herein.

| Comparisons | Pairs | PSNR | LPIPS | HyperIQA | MUSIQ | System 102 |
| --- | --- | --- | --- | --- | --- | --- |
| Model 1/Model 2 | 321 | 56.70% | 62.31% | 39.97% | 65.11% | 65.42% |
| Model 1/Model 3 | 367 | 48.77% | 48.77% | 51.50% | 55.31% | 69.21% |
| Model 2/Model 4 | 560 | 23.92% | 11.96% | 56.39% | 49.62% | 79.82% |
| Model 1/Model 4 | 718 | 44.71% | 43.45% | 35.71% | 71.72% | 72.70% |
| Overall | 1966 | 41.50% | 38.55% | 45.24% | 61.28% | 72.89% |

As shown in Table 2, out of 1000 images for each comparison, the experimenters found that user reach strong agreement on a subset of images with quantity ranging from 321 to 718 indicated in the second column. Additionally, as indicated in column two, performance of strong digital image inpainting models results in less agreement in image comparisons. The remaining columns indicate percentage of correct ranking for each of a plurality of metrics with respect to human perceptual judgment. As shown in Table 2, the results indicate that the artifact ratio metric determined by the artifact segmentation system 102 outperforms the other existing metrics for assessing inpainting quality in object removal scenarios.

Table 3 below provides additional experimental results regarding improvements provided by an iterative inpainting process. Specifically, Table 3 includes a comparison of user preferences of inpainted digital images based on an original inpainting operation and iterative inpainted digital images. As shown, the users preferred the iterative inpainted digital images in a significant number of cases (up to ~38% of the time) and indicated that the iterative process rarely reduced the quality of the digital images.

| Model | Preferred Original | Same | Preferred Iterative |
| --- | --- | --- | --- |
| Model 1 | 10.6% | 51.6% | 37.8% |
| Model 2 | 9.0% | 66.8% | 24.2% |
| Model 3 | 2.8% | 67.4% | 29.8% |
| Model 4 | 1.8% | 68.2% | 30.0% |

Figure 12:
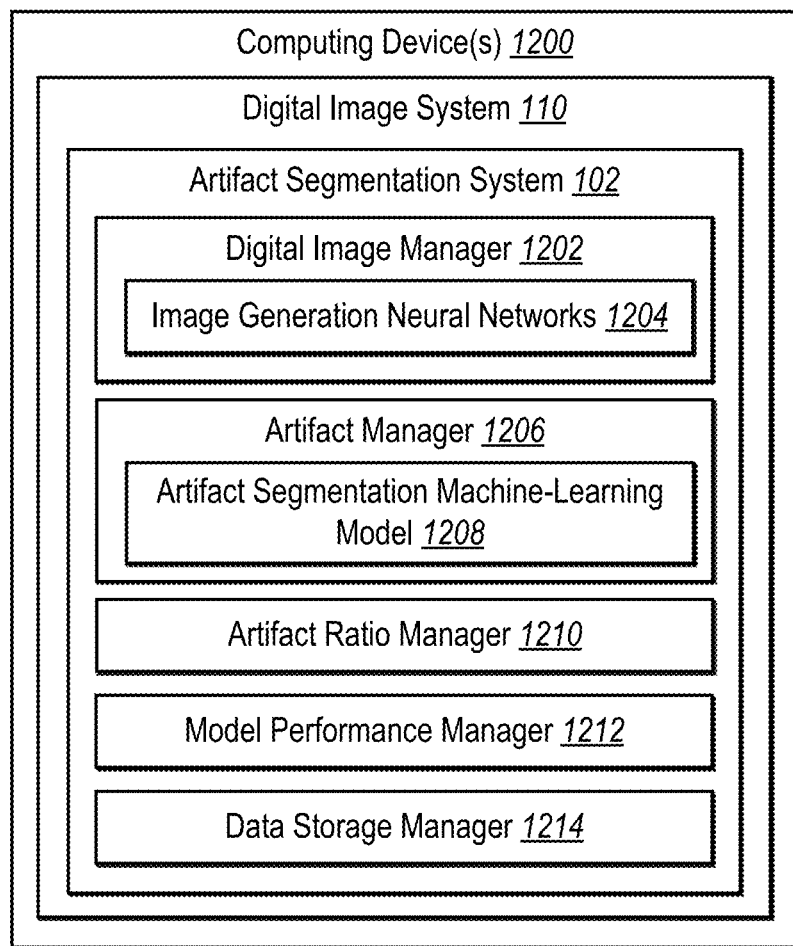
FIG. 12 illustrates a diagram of the artifact segmentation system of FIG. 1 in accordance with one or more implementations.

FIG. 12 illustrates a detailed schematic diagram of an embodiment of the artifact segmentation system 102 described above. As shown, the artifact segmentation system 102 is implemented in a digital image system 110 on computing device(s) 1200 (e.g., a client device and/or server device as described in FIG. 1, and as further described below in relation to FIG. 12). Additionally, the artifact segmentation system 102 includes, but is not limited to, a digital image manager 1202 including image generation neural networks 1204, an artifact manager 1206 including an artifact segmentation machine-learning model 1208, an artifact ratio manager 1210, a model performance manager 1212, and a data storage manager 1214. The artifact segmentation system 102 can be implemented on any number of computing devices. For example, the artifact segmentation system 102 can be implemented in a distributed system of server devices for editing digital images. The artifact segmentation system 102 can also be implemented within one or more additional systems. Alternatively, the artifact segmentation system 102 can be implemented on a single computing device such as a single client device.

In one or more embodiments, each of the components of the artifact segmentation system 102 is in communication with other components using any suitable communication technologies. Additionally, the components of the artifact segmentation system 102 are capable of being in communication with one or more other devices including other computing devices of a user, server devices (e.g., cloud storage devices), licensing servers, or other devices/systems. It will be recognized that although the components of the artifact segmentation system 102 are shown to be separate in FIG. 12, any of the subcomponents may be combined into fewer components, such as into a single component, or divided into more components as may serve a particular implementation. Furthermore, although the components of FIG. 12 are described in connection with the artifact segmentation system 102, at least some of the components for performing operations in conjunction with the artifact segmentation system 102 described herein may be implemented on other devices within the environment.

In some embodiments, the components of the artifact segmentation system 102 include software, hardware, or both. For example, the components of the artifact segmentation system 102 include one or more instructions stored on a computer-readable storage medium and executable by processors of one or more computing devices (e.g., the computing device(s) 1200). When executed by the one or more processors, the computer-executable instructions of the artifact segmentation system 102 cause the computing device(s) 1200 to perform the operations described herein. Alternatively, the components of the artifact segmentation system 102 can include hardware, such as a special purpose processing device to perform a certain function or group of functions. Additionally, or alternatively, the components of the artifact segmentation system 102 can include a combination of computer-executable instructions and hardware.

Furthermore, the components of the artifact segmentation system 102 performing the functions described herein with respect to the artifact segmentation system 102 may, for example, be implemented as part of a stand-alone application, as a module of an application, as a plug-in for applications, as a library function or functions that may be called by other applications, and/or as a cloud-computing model. Thus, the components of the artifact segmentation system 102 may be implemented as part of a stand-alone application on a personal computing device or a mobile device. Alternatively, or additionally, the components of the artifact segmentation system 102 may be implemented in any application that provides digital image modification, including, but not limited to ADOBE® CREATIVE CLOUD®, ADOBE® PHOTOSHOP®, and ADOBE® LIGHTROOM®.

The artifact segmentation system 102 includes a digital image manager 1202 to manage generating and/or editing of digital images. For example, the digital image manager 1202 stores digital images or obtains digital images from a third-party source (e.g., a digital image database). Additionally, the digital image manager 1202 generates or modifies digital images by utilizing the image generation neural networks 1204 to generate synthetic digital image content. The digital image manager 1202 also manages digital image masks associated with modifying digital images (e.g., in a digital image inpainting process). To illustrate, the image generation neural networks 1204 include digital image inpainting models.

The artifact segmentation system 102 includes an artifact manager 1206 to detect perceptual artifacts in digital images. Specifically, the artifact manager 1206 utilizes the artifact segmentation machine-learning model 1208 to determine predicted perceptual artifact regions in synthetically modified portions of digital images. The artifact manager 1206 also generates artifact segmentations based on the predicted perceptual artifact regions.

The artifact segmentation system 102 includes the artifact ratio manager 1210 to determined artifact ratio metrics based on detected perceptual artifacts. In particular, the artifact ratio manager 1210 determines artifact ratio metrics based on sizes of detected artifacts relative to sizes of input holes (e.g., relative to digital image masks). The artifact ratio manager 1210 determines artifact ratio metrics in connection with digital image inpainting processes. The artifact ratio manager 1210 also determines artifact ratio metrics in connection with determining neural network performances.

The artifact segmentation system 102 includes a model performance manager 1212. Specifically, the model performance manager 1212 communicates with the artifact ratio manager 1210 to determine artifact ratio metrics based on digital images. To illustrate, the model performance manager 1212 compares artifact ratio metrics based on synthetically modified portions generated utilizing different image generation neural networks. The model performance manager 1212 utilizes the comparisons to generate neural network performances and/or for selecting image generation neural networks to use in digital image inpainting iterations.

The artifact segmentation system 102 also includes a data storage manager 1214 (that comprises a non-transitory computer memory/one or more memory devices) that stores and maintains data associated with generating synthetic digital image content. For example, the data storage manager 1214 stores data associated with digital images including digital image masks, synthetic digital image content, perceptual artifacts, and artifact ratio metrics. The data storage manager 1214 also stores data associated with image generation neural networks and artifact segmentation machine-learning models, including labeled digital images for training the neural networks.

Figure 13:
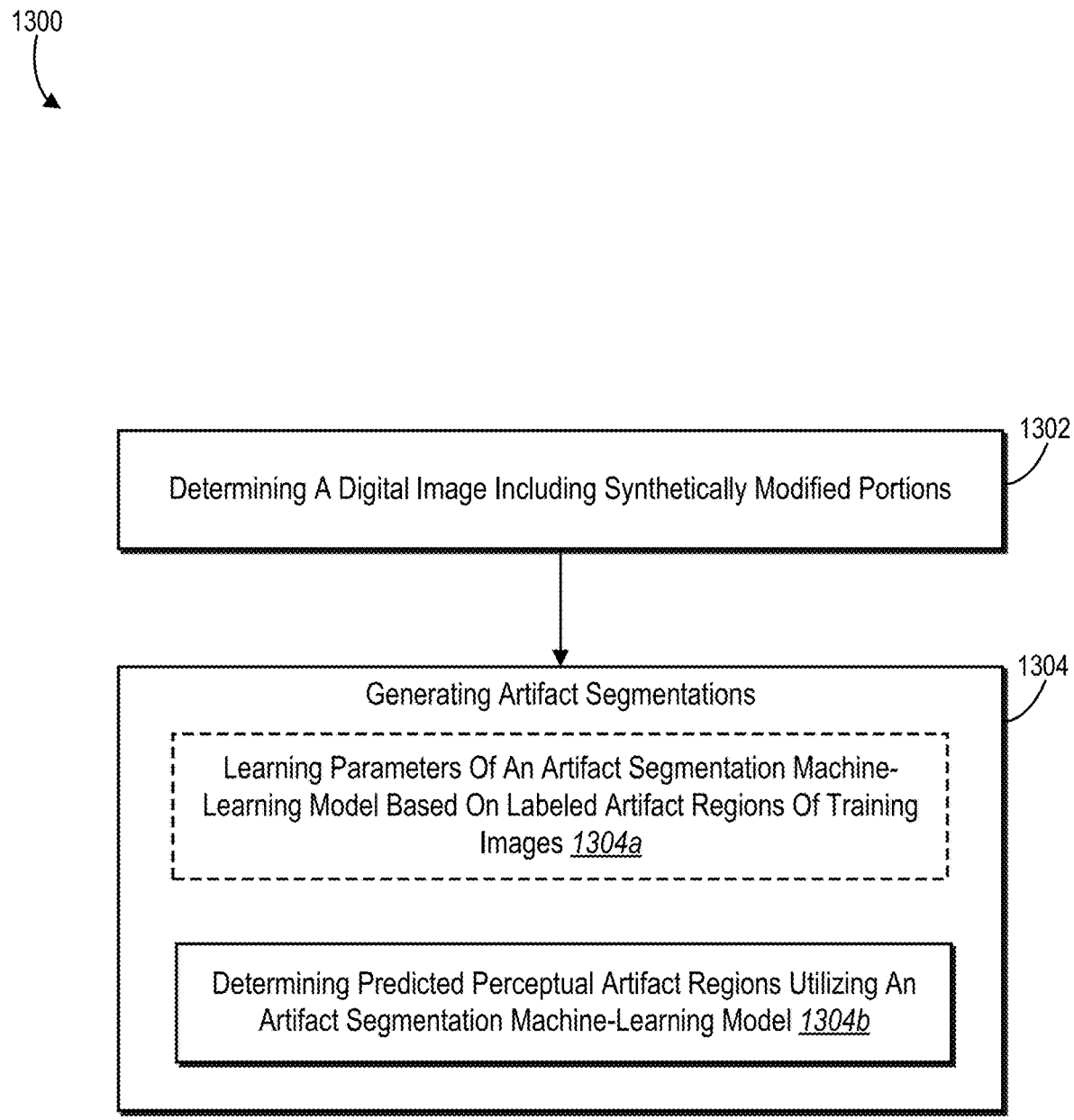
FIG. 13 illustrates a flowchart of a series of acts for detecting perceptual artifacts utilizing an artifact segmentation machine-learning model in accordance with one or more implementations.

Turning now to FIG. 13, this figure shows a flowchart of a series of acts 1300 of detecting perceptual artifacts utilizing an artifact segmentation machine-learning model. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13.

As shown, the series of acts 1300 includes an act 1302 of determining a digital image including synthetically modified portions. For example, act 1302 involves determining a digital image comprising one or more synthetically modified portions. To illustrate, act 1302 can involve generating the one or more synthetically modified portions utilizing an image generation neural network. For example, act 1302 can involve generating, utilizing a digital image inpainting model, the one or more synthetically modified portions according to a digital image mask associated with a detected object. Act 1302 can involve selecting the digital image comprising the one or more synthetically modified portions from a database of digital images.

The series of acts 1300 also includes an act 1304 of generating artifact segmentations. In one or more embodiments, act 1304 optionally includes a sub-act 1304a of learning parameters of an artifact segmentation machine-learning model based on labeled artifact regions of training images. In one or more embodiments, the artifact segmentation machine-learning model comprises parameters learned based on labeled artifact regions of synthetic training digital images.

In one or more embodiments, act 1304 also includes a sub-act 1304*b* of determining predicted perceptual artifact regions utilizing an artifact segmentation machine-learning model. For example, sub-act 1304*b* involves determining, utilizing an artifact segmentation machine-learning model, one or more predicted perceptual artifact regions indicating one or more artifacts corresponding to pixels within the one or more synthetically modified portions of the digital image.

Sub-act 1304*b* can involve determining, utilizing the artifact segmentation machine-learning model, a plurality of predicted perceptual artifact regions corresponding to a plurality of separate artifacts within a synthetically modified portion of the digital image. For example, sub-act 1304*b* can involve determining, utilizing the artifact segmentation machine-learning model, a first predicted perceptual artifact region corresponding to a first artifact within a synthetically modified portion of the digital image. Sub-act 1304*b* can also involve determining, utilizing the artifact segmentation machine-learning model, a second predicted perceptual artifact region corresponding to a second artifact within the synthetically modified portion of the digital image.

The series of acts 1300 can include determining a combined size of one or more artifacts within a synthetically modified portion of the one or more synthetically modified portions of the digital image. The series of acts 1300 can further include determining a size of the synthetically modified portion of the digital image. The series of acts 1300 can include generating an artifact ratio metric for the digital image based on the combined size of the one or more artifacts relative to the size of the synthetically modified portion.

The series of acts 1300 can include providing, within a graphical user interface of a client device, an indication of the artifact ratio metric for the digital image. For example, the series of acts 1300 can include generating, for display within a graphical user interface of a client device, one or more indications of the one or more artifact segmentations in the digital image. In one or more embodiments, the series of acts 1300 includes generating, for display within a graphical user interface of a client device, one or more indications of the one or more predicted perceptual artifact regions based on a size of the one or more predicted perceptual artifact regions.

The series of acts 1300 can also include generating a plurality of candidate digital images comprising one or more synthetically modified portions, the plurality of candidate digital images comprising the digital image. The series of acts 1300 can include generating a plurality of artifact ratio metrics corresponding to the plurality of candidate digital images based on artifacts relative to sizes of the one or more synthetically modified portions of the plurality of candidate digital images. The series of acts 1300 can further include selecting the digital image from the plurality of candidate digital images based on the plurality of artifact ratio metrics.

The series of acts 1300 can include generating an artifact ratio metric for the digital image based on a combined size of the one or more predicted perceptual artifact regions relative to a combined size of the one or more synthetically modified portions. For example, the series of acts 1300 can include determining a ratio of a combined size of the one or more artifacts relative to a combined size of the one or more synthetically modified portions. The series of acts 1300 can also include providing, for display within a graphical user interface of a client device, an indication to further modify the one or more synthetically modified portions of the digital image in response to comparing the artifact ratio metric to a ratio threshold. The series of acts 1300 can include generating, in response to comparing the artifact ratio metric to a ratio threshold, a recommendation to generate an additional synthetic modified portion within a portion of the digital image corresponding to an artifact segmentation of the one or more artifact segmentations.

The series of acts 1300 can include generating, utilizing an image generation neural network, an additional synthetically modified portion replacing an artifact within the synthetically modified portion in response to comparing the artifact ratio metric to a ratio threshold.

The series of acts 1300 can include generating, based on the artifact ratio metric, a performance comparison of an image generation neural network utilized to generate the digital image relative to an additional image generation neural network. For example, the series of acts 1300 can further include determining, based on the artifact ratio metric for the digital image, a first performance of a first image generation neural network utilized to generate the one or more synthetically modified portions of the digital image. The series of acts 1300 can include determining, based on an additional artifact ratio metric for an additional version of the digital image, a second performance of a second image generation neural network utilized to generate one or more additional synthetically modified portions of the additional version of the digital image. The series of acts 1300 can include providing, for display within a graphical user interface, a comparison of the first performance of the first image generation neural network and the second performance of the second image generation neural network.

The series of acts 1300 can include generating an artifact ratio metric for the digital image based on a combined size of the one or more predicted perceptual artifact regions relative to a combined size of the one or more synthetically modified portions. The series of acts 1300 can also include determining, based on the artifact ratio metric for the digital image, a performance of an image generation neural network that generated the one or more synthetically modified portions of the digital image. The series of acts 1300 can include providing, for display within a graphical user interface of a client device, an indication of the performance of the image generation neural network.

The series of acts 1300 can include generating predicted artifact bounding regions for portions of the synthetic training digital images. The series of acts 1300 can also include generating modified artifact bounding regions by dilating synthetically modified regions corresponding to the predicted artifact bounding regions by a predetermined amount. Additionally, the series of acts 1300 can include providing, for display at a client device, the synthetic training digital images including the modified artifact bounding regions.

The series of acts 1300 can include providing, to a plurality of client devices, the synthetic training digital images with dilated artifact bounding regions corresponding to a plurality of artifacts in the synthetic training digital images. The series of acts 1300 can include determining the labeled artifact regions in response to user interactions with the synthetic training digital images. The series of acts 1300 can include learning the parameters of the artifact segmentation machine-learning model based on the labeled artifact regions in the synthetic training digital images and ground-truth training digital images.

Furthermore, the series of acts 1300 can include determining a plurality of marked regions of the synthetic training digital images based on user inputs. The series of acts 1300 can include determining the labeled artifact regions by intersecting the plurality of marked regions and hole masks corresponding to synthetically modified portions of the synthetic training digital images. The series of acts 1300 can also include learning the parameters of the artifact segmentation machine-learning model based on the labeled artifact regions.

The series of acts 1300 can include generating a predicted artifact bounding region for a portion of a synthetic training digital image of the synthetic training digital image. The series of acts 1300 can include generating a modified artifact bounding region by dilating a synthetically modified region corresponding to the predicted artifact bounding region to a rectangle enclosing the synthetically modified region. The series of acts 1300 can also include providing, for display at a client device, the synthetic training digital image comprising the modified artifact bounding region and a duplicate of the synthetic training digital image. The series of acts 1300 can further include determining, based on a user input via the client device, a labeled artifact region indicating an artifact within the modified artifact bounding region.

Figure 14:
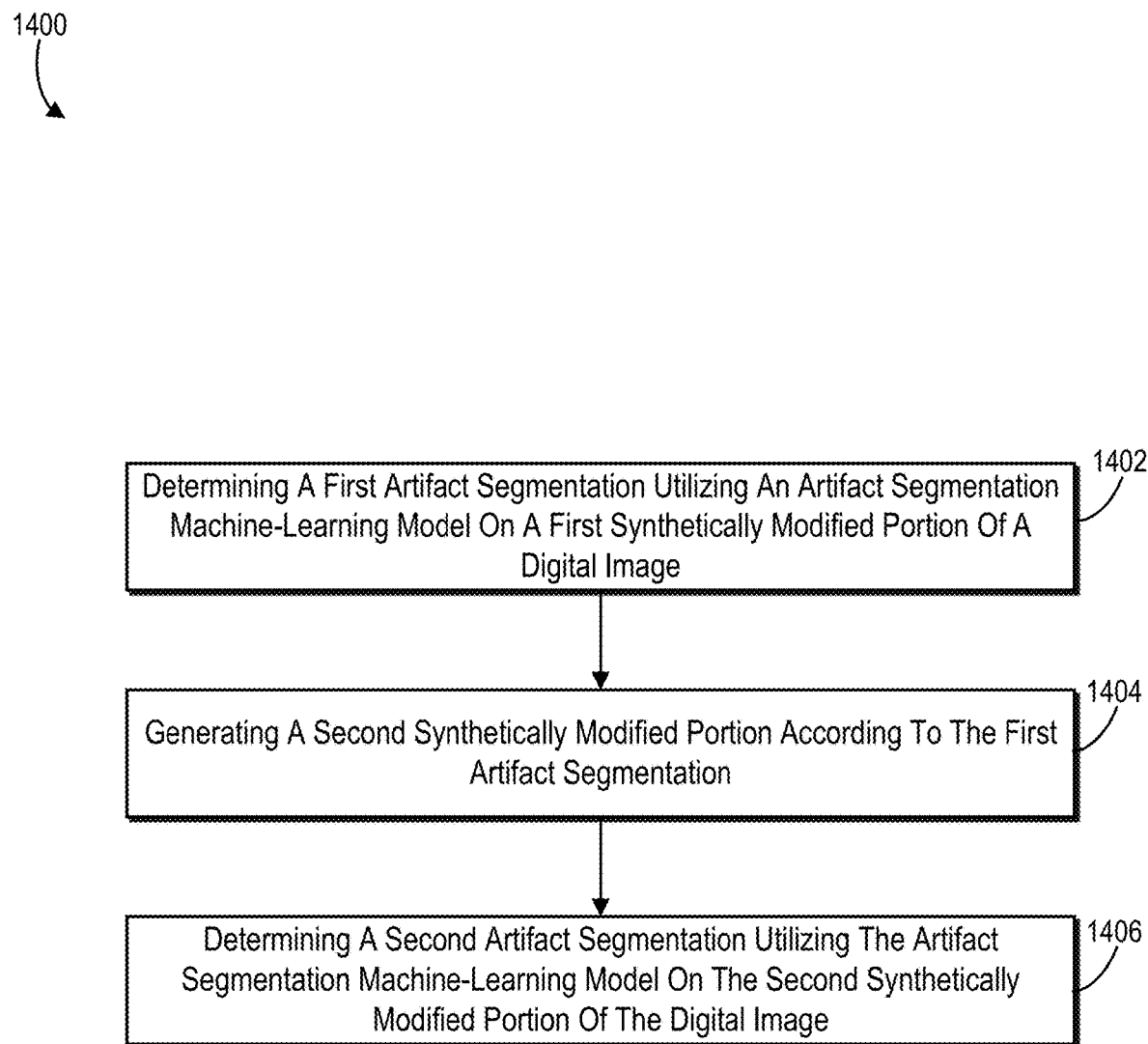
FIG. 14 illustrates a flowchart of a series of acts for utilizing an artifact segmentation machine-learning model to perform iterative digital image inpainting in accordance with one or more implementations.

Turning now to FIG. 14, this figure shows a flowchart of a series of acts 1400 of utilizing an artifact segmentation machine-learning model to perform iterative digital image inpainting. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

The series of acts 1400 includes an act 1402 of determining a first artifact segmentation utilizing an artifact segmentation machine-learning model on a first synthetically modified portion of a digital image. For example, act 1402 involves determining, utilizing an artifact segmentation machine-learning model on a first synthetically modified portion of a digital image, a first artifact segmentation corresponding to a first predicted perceptual artifact region within the first synthetically modified portion of the digital image.

In one or more embodiments, the series of acts 1400 also includes generating, utilizing the digital image inpainting model, the first synthetically modified portion according to an initial hole mask for the digital image. For example, the series of acts 1400 can include generating, utilizing a plurality of digital image inpainting models, a plurality of synthetically modified portions for the digital image according to the initial hole mask. The series of acts 1400 can also include generating the first synthetically modified portion of the digital image utilizing an additional image inpainting model different than the digital image inpainting model utilized to generate the second synthetically modified portion. For example, the series of acts 1400 can include selecting the first synthetically modified portion from the plurality of synthetically modified portions based on an artifact ratio metric corresponding to the first synthetically modified portion.

The series of acts 1400 can include generating the first synthetically modified portion utilizing a first digital image inpainting model of the one or more digital image inpainting models. The series of acts 1400 can also include generating the second synthetically modified portion utilizing a second digital image inpainting model of the one or more digital image inpainting models, the first digital image inpainting model being different than the second digital image inpainting model.

The series of acts 1400 includes an act 1404 of generating a second synthetically modified portion according to the first artifact segmentation. Act 1404 involves generating, utilizing a digital image inpainting model, a second synthetically modified portion for the first predicted perceptual artifact region according to the first artifact segmentation.

Act 1404 can involve generating an artifact ratio metric based on a size of the first predicted perceptual artifact region relative to a size of an initial hole mask. Act 1404 can also involve generating, utilizing the digital image inpainting model, the second synthetically modified portion in response to comparing the artifact ratio metric to a ratio threshold. For example, act 1404 can involve generating the second synthetically modified portion in response to comparing an artifact ratio metric based on a size of the first predicted perceptual artifact region and a size of the first artifact segmentation to a ratio threshold. Act 1404 can involve generating, in response to comparing the artifact ratio metric to a ratio threshold, the second synthetically modified portion by inserting the second synthetically modified portion within the digital image according to the first artifact segmentation.

In one or more embodiments, the series of acts 1400 includes generating the first synthetically modified portion utilizing a first digital image inpainting model selected from a plurality of digital image inpainting models. Act 1404 can involve generating the second synthetically modified portion utilizing a second digital image inpainting model selected from the plurality of digital image inpainting models.

The series of acts 1400 also includes an act 1406 of determining a second artifact segmentation utilizing the artifact segmentation machine-learning model on the second synthetically modified portion of the digital image. Act 1406 involves determining, utilizing the artifact segmentation machine-learning model on the second synthetically modified portion of the digital image, a second artifact segmentation corresponding to a second predicted perceptual artifact region as a subregion of the first predicted perceptual artifact region.

Act 1406 can involve generating an additional artifact ratio metric based on a size of the second predicted perceptual artifact region relative to a size of the first artifact segmentation. Act 1406 can also involve generating a final modified digital image comprising the second artifact segmentation in response to comparing the additional artifact ratio metric to the ratio threshold. Additionally, act 1406 can involve generating a final modified digital image in response to comparing one or more artifact ratio metrics corresponding to the plurality of predicted perceptual artifact regions to a ratio threshold. Act 1406 can involve generating, from the digital image in response to comparing the additional artifact ratio metric to the ratio threshold, a final modified digital image comprising the second synthetically modified portion inserted into the first synthetically modified portion according to the first artifact segmentation and the initial hole mask.

Act 1406 can involve generating, utilizing a plurality of digital image inpainting models comprising the digital image inpainting model, a plurality of synthetically modified portions for the first predicted perceptual artifact region according to the first artifact segmentation. Act 1406 can also involve generating a modified digital image comprising the second synthetically modified portion generated from the plurality of synthetically modified portions based on a performance of the digital image inpainting model.

Act 1406 can involve determining, utilizing the artifact segmentation machine-learning model on the plurality of synthetically modified portions, a plurality of artifact segmentations corresponding to a plurality of predicted perceptual artifact regions. Act 1406 can also involve generating, for the plurality of synthetically modified portions, a plurality of artifact ratio metrics based on sizes of the plurality of artifact segmentations relative to a size of the second artifact segmentation. Act 1406 can further involve selecting, based on the plurality of artifact ratio metrics, the second synthetically modified portion from the plurality of synthetically modified portions for generating the modified digital image.

The series of acts 1400 can include generating, utilizing one or more digital image inpainting models, a plurality of synthetically modified portions comprising the first synthetically modified portion and the second synthetically modified portion in a plurality of inpainting iterations according to a predetermined number of iterations.

The series of acts 1400 can include determining, utilizing the artifact segmentation machine-learning model on the first synthetically modified portion of the digital image, an additional artifact segmentation corresponding to an additional predicted perceptual artifact region as an additional subregion of the first predicted perceptual artifact region. The series of acts 1400 can also include generating, utilizing one or more digital image inpainting models, an additional synthetically modified portion of the additional predicted perceptual artifact region according to the additional artifact segmentation.

The series of acts 1400 can include determining, utilizing the artifact segmentation machine-learning model on the second synthetically modified portion of the digital image, one or more additional artifact segmentations corresponding to one or more predicted perceptual artifact regions as one or more subregions of the second synthetically modified portion of the digital image.

The series of acts 1400 can include determining a plurality of inpainting iterations utilizing the one or more digital image inpainting models based on sizes of a plurality of predicted perceptual artifact regions, the plurality of predicted perceptual artifact regions determined utilizing the artifact segmentation machine-learning model in connection with a plurality of synthetically modified portions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
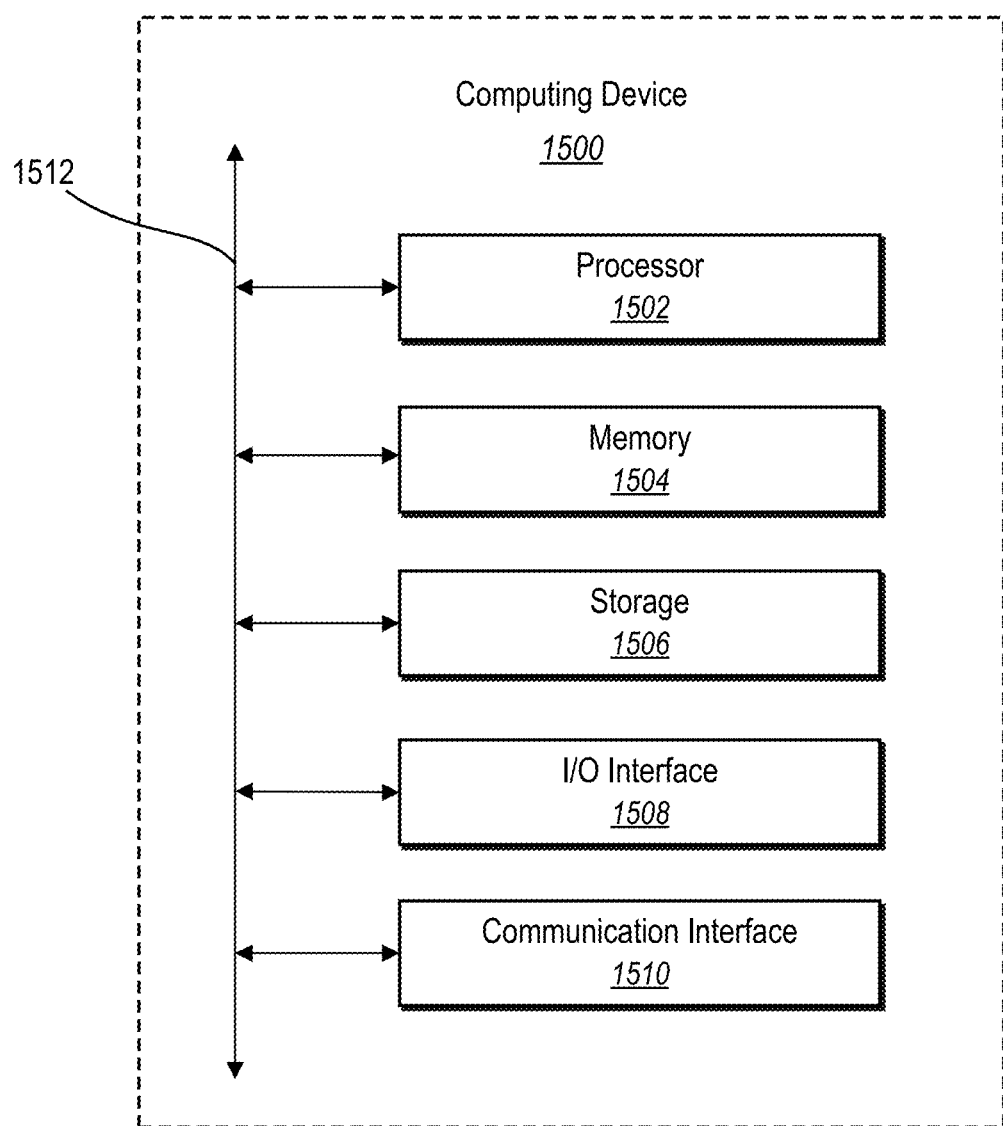
FIG. 15 illustrates a block diagram of an exemplary computing device in accordance with one or more embodiments.

FIG. 15 illustrates a block diagram of exemplary computing device 1500 that may be configured to perform one or more of the processes described above. One will appreciate that one or more computing devices such as the computing device 1500 may implement the system(s) of FIG. 1. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for dynamically modifying workflows, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions for performing the methods described herein.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example, and not by way of limitation, the communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
    determining, utilizing an artifact segmentation machine-learning model on a first synthetically modified portion of a digital image, a first artifact segmentation corresponding to a first predicted perceptual artifact region within the first synthetically modified portion of the digital image, the first predicted perceptual artifact region comprising a portion of the first synthetically modified portion of the digital image predicted to include at least one perceptual artifact;
    generating, utilizing a digital image inpainting model, a second synthetically modified portion for the first predicted perceptual artifact region according to the first artifact segmentation; and
    determining, utilizing the artifact segmentation machine-learning model on the second synthetically modified portion of the digital image, a second artifact segmentation corresponding to a second predicted perceptual artifact region as a subregion within the first predicted perceptual artifact region.

2. The computer-implemented method of claim 1, further comprising generating, utilizing the digital image inpainting model, the first synthetically modified portion according to an initial hole mask for the digital image.

3. The computer-implemented method of claim 1, further comprising generating the first synthetically modified portion of the digital image utilizing an additional image inpainting model different than the digital image inpainting model utilized to generate the second synthetically modified portion.

4. The computer-implemented method of claim 1, further comprising:
    generating an artifact ratio metric based on a size of the first predicted perceptual artifact region relative to a size of an initial hole mask; and
    generating, utilizing the digital image inpainting model, the second synthetically modified portion in response to comparing the artifact ratio metric to a ratio threshold.

5. The computer-implemented method of claim 4, further comprising:
    generating an additional artifact ratio metric based on a size of the second predicted perceptual artifact region relative to a size of the first artifact segmentation; and
    generating a final modified digital image comprising the second artifact segmentation in response to comparing the additional artifact ratio metric to the ratio threshold.

6. The computer-implemented method of claim 1, further comprising generating, utilizing one or more digital image inpainting models, a plurality of synthetically modified portions comprising the first synthetically modified portion and the second synthetically modified portion in a plurality of inpainting iterations according to a predetermined number of iterations.

7. The computer-implemented method of claim 1, further comprising:
    determining, utilizing the artifact segmentation machine-learning model on the first synthetically modified portion of the digital image, an additional artifact segmentation corresponding to an additional predicted perceptual artifact region as an additional subregion of the first predicted perceptual artifact region; and
    generating, utilizing one or more digital image inpainting models, an additional synthetically modified portion of the additional predicted perceptual artifact region according to the additional artifact segmentation.

8. A system comprising:
    one or more computer memory devices; and
    one or more servers configured to cause the system to:
        generate, utilizing one or more digital image inpainting models, a first synthetically modified portion for a digital image according to an initial hole mask;
        determine, utilizing an artifact segmentation machine-learning model on the first synthetically modified portion of the digital image, a first artifact segmentation corresponding to a first predicted perceptual artifact region within the first synthetically modified portion of the digital image, the first predicted perceptual artifact region comprising a portion of the first synthetically modified portion of the digital image predicted to include at least one perceptual artifact; and
        generate, utilizing the one or more digital image inpainting models, a second synthetically modified portion for the first predicted perceptual artifact region according to the first artifact segmentation.

9. The system of claim 8, wherein the one or more servers are further configured to cause the system to determine, utilizing the artifact segmentation machine-learning model on the second synthetically modified portion of the digital image, one or more additional artifact segmentations corresponding to one or more predicted perceptual artifact regions as one or more subregions of the second synthetically modified portion of the digital image.

10. The system of claim 8, wherein the one or more servers are further configured to cause the system to:
    generate the first synthetically modified portion utilizing a first digital image inpainting model of the one or more digital image inpainting models; and
    generate the second synthetically modified portion utilizing a second digital image inpainting model of the one or more digital image inpainting models, the first digital image inpainting model being different than the second digital image inpainting model.

11. The system of claim 8, wherein the one or more servers are further configured to cause the system to generate the second synthetically modified portion in response to comparing an artifact ratio metric based on a size of the first predicted perceptual artifact region and a size of the first artifact segmentation to a ratio threshold.

12. The system of claim 8, wherein the one or more servers are further configured to cause the system to determine a plurality of inpainting iterations utilizing the one or more digital image inpainting models based on sizes of a plurality of predicted perceptual artifact regions, the plurality of predicted perceptual artifact regions determined utilizing the artifact segmentation machine-learning model in connection with a plurality of synthetically modified portions.

13. The system of claim 12, wherein the one or more servers are further configured to cause the system to generate a final modified digital image in response to comparing one or more artifact ratio metrics corresponding to the plurality of predicted perceptual artifact regions to a ratio threshold.

14. A non-transitory computer readable medium comprising instructions that, when executed by at least one processor, cause a computing device to:
    generate a first synthetically modified portion for a digital image according to an initial hole mask;
    determine, utilizing an artifact segmentation machine-learning model on the first synthetically modified portion of the digital image, a first artifact segmentation corresponding to a first predicted perceptual artifact region within the first synthetically modified portion of the digital image, the first predicted perceptual artifact region comprising a portion of the first synthetically modified portion of the digital image predicted to include at least one perceptual artifact;

generate a second synthetically modified portion for the first predicted perceptual artifact region according to the first artifact segmentation; and determine, utilizing the artifact segmentation machine-learning model on the second synthetically modified portion of the digital image, a second artifact segmentation corresponding to a second predicted perceptual artifact region as a subregion of within the first predicted perceptual artifact region.

15. The non-transitory computer readable medium of claim 14, further comprising instructions that, when executed by the at least one processor, cause the computing device to:

generate the first synthetically modified portion utilizing a first digital image inpainting model selected from a plurality of digital image inpainting models; and generate the second synthetically modified portion utilizing a second digital image inpainting model selected from the plurality of digital image inpainting models.

16. The non-transitory computer readable medium of claim 14, further comprising instructions that, when executed by the at least one processor, cause the computing device to:

generate an artifact ratio metric based on a size of the first predicted perceptual artifact region relative to a size of the initial hole mask; and generate, in response to comparing the artifact ratio metric to a ratio threshold, the second synthetically modified portion by inserting the second synthetically modified portion within the digital image according to the first artifact segmentation.

17. The non-transitory computer readable medium of claim 16, further comprising instructions that, when executed by the at least one processor, cause the computing device to:

generate an additional artifact ratio metric based on a size of the second predicted perceptual artifact region relative to a size of the first artifact segmentation; and generate, from the digital image in response to comparing the additional artifact ratio metric to the ratio threshold, a final modified digital image comprising the second synthetically modified portion inserted into the first synthetically modified portion according to the first artifact segmentation and the initial hole mask.

* * * * *